(12) United States Patent
Hickey et al.

(10) Patent No.: US 9,004,553 B2
(45) Date of Patent: Apr. 14, 2015

(54) COMPLIANT SOLID-STATE BUMPER FOR ROBOT

(71) Applicant: iRobot Corporation, Bedford, MA (US)

(72) Inventors: Stephen A. Hickey, Somerville, MA (US); Andrew Pastore, Watertown, MA (US); Chikyung Won, Tewksbury, MA (US); Roger Dale Gamble, Bedford, MA (US); Andrew Beaulieu, Watertown, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 14/277,270

(22) Filed: May 14, 2014

(65) Prior Publication Data

US 2014/0246874 A1     Sep. 4, 2014

Related U.S. Application Data

(62) Division of application No. 13/803,617, filed on Mar. 14, 2013.

(60) Provisional application No. 61/611,550, filed on Mar. 15, 2012.

(51) Int. Cl.
*B60R 19/02* (2006.01)
*B60R 19/48* (2006.01)
(Continued)

(52) U.S. Cl.
CPC ........... *B60R 19/483* (2013.01); *B25J 19/0091* (2013.01); *G05D 1/0227* (2013.01); *G05D 1/021* (2013.01); *G05D 1/0238* (2013.01);
(Continued)

(58) Field of Classification Search
CPC .. B60R 19/483; B25J 19/0091; G05D 1/0227
USPC ................. 293/4, 102, 117; 901/46
See application file for complete search history.

(56) References Cited

U.S. PATENT DOCUMENTS 5,010,774 A * 4/1991 Kikuo et al. ............. 73/862.046
6,389,329 B1   5/2002 Colens
(Continued)

FOREIGN PATENT DOCUMENTS

EP        2386877 A1     11/2011
WO   WO-2007065034 A1   6/2007

OTHER PUBLICATIONS

Manel Frigola et al., "Human-Robot Interaction Based on a Sensitive Bumper Skin", Intelligent Robots and Systems, 2006 IEEE/RSJ International Conference ON, IEEE, PI, Oct. 1, 2006.
(Continued)

*Primary Examiner* — Jason S Morrow
(74) *Attorney, Agent, or Firm* — Honigman Miller Schwartz and Cohn LLP

(57) ABSTRACT

A robot bumper including a bumper body having a forward surface and a top surface angling away from the forward surface. The bumper body conforms to a shape of a received robot chassis. The robot bumper also includes a force absorbing layer disposed on the bumper body, a membrane switch layer comprising a plurality of electrical contacts arranged along the top surface of the bumper body, and a force transmission layer disposed between the force absorbing layer and the membrane switch layer. The force transmission layer includes a plurality of force transmitting elements configured to transmit force to the membrane switch layer.

9 Claims, 22 Drawing Sheets

(51) Int. Cl.
*B25J 19/00* (2006.01)
*G05D 1/02* (2006.01)

(52) U.S. Cl.
CPC ..... *A47L2201/04* (2013.01); *G05D 2201/0215* (2013.01); *Y10S 901/46* (2013.01)

(56) References Cited

U.S. PATENT DOCUMENTS

| | | |
|---|---|---|
| 6,532,404 B2 | 3/2003 | Colens |
| 6,594,844 B2 | 7/2003 | Jones |
| 6,690,134 B1 | 2/2004 | Jones et al. |
| 6,781,338 B2 | 8/2004 | Jones et al. |
| 6,809,490 B2 | 10/2004 | Jones et al. |
| 6,965,209 B2 | 11/2005 | Jones et al. |
| 6,990,435 B2 * | 1/2006 | Kaneko et al. ................ 702/189 |
| 7,155,308 B2 | 12/2006 | Jones |
| 7,173,391 B2 | 2/2007 | Jones et al. |
| 7,196,487 B2 | 3/2007 | Jones et al. |
| 7,388,343 B2 | 6/2008 | Jones et al. |
| 7,389,156 B2 | 6/2008 | Ziegler et al. |
| 7,448,113 B2 | 11/2008 | Jones et al. |
| 7,571,511 B2 | 8/2009 | Jones et al. |
| 7,636,982 B2 | 12/2009 | Jones et al. |
| 7,761,954 B2 | 7/2010 | Ziegler et al. |
| 8,801,057 B2 * | 8/2014 | Kim et al. ........................ 293/4 |
| 2002/0016649 A1 | 2/2002 | Jones |
| 2002/0120364 A1 | 8/2002 | Colens |
| 2003/0025472 A1 | 2/2003 | Jones et al. |
| 2004/0020000 A1 | 2/2004 | Jones |
| 2004/0049877 A1 | 3/2004 | Jones et al. |
| 2004/0187457 A1 | 9/2004 | Colens |
| 2004/0207355 A1 | 10/2004 | Jones et al. |
| 2005/0067994 A1 | 3/2005 | Jones et al. |
| 2005/0204717 A1 | 9/2005 | Colens |
| 2007/0266508 A1 | 11/2007 | Jones et al. |
| 2008/0091303 A1 * | 4/2008 | Jung et al. ..................... 700/247 |
| 2008/0091305 A1 * | 4/2008 | Svendsen et al. ............. 700/258 |
| 2008/0140255 A1 | 6/2008 | Ziegler et al. |
| 2008/0155768 A1 | 7/2008 | Ziegler et al. |
| 2008/0237002 A1 * | 10/2008 | Zhang ........................ 200/61.42 |
| 2008/0307590 A1 | 12/2008 | Jones et al. |
| 2009/0038403 A1 * | 2/2009 | Kamei et al. .................... 73/774 |
| 2010/0049365 A1 | 2/2010 | Jones et al. |
| 2010/0235000 A1 * | 9/2010 | Hsu ................................ 700/275 |
| 2010/0257690 A1 | 10/2010 | Jones et al. |
| 2010/0257691 A1 | 10/2010 | Jones et al. |
| 2010/0263158 A1 | 10/2010 | Jones et al. |
| 2011/0121591 A1 * | 5/2011 | Nishiwaki .................... 294/86.4 |
| 2011/0278082 A1 * | 11/2011 | Chung et al. .................. 180/167 |
| 2012/0144932 A1 * | 6/2012 | Ikebe et al. ................ 73/862.041 |
| 2012/0198945 A1 * | 8/2012 | Yoneyama ................ 73/862.042 |
| 2013/0241217 A1 * | 9/2013 | Hickey et al. .................. 293/117 |
| 2014/0138964 A1 * | 5/2014 | Shin et al. ...................... 293/117 |

OTHER PUBLICATIONS

Dirk Goger et al., "Sensitive Skin for a Humanoid Robot", Conference on Human-Centered Robotic Systems (HCRS 06), Munich, Oct. 6, 2006.

* cited by examiner

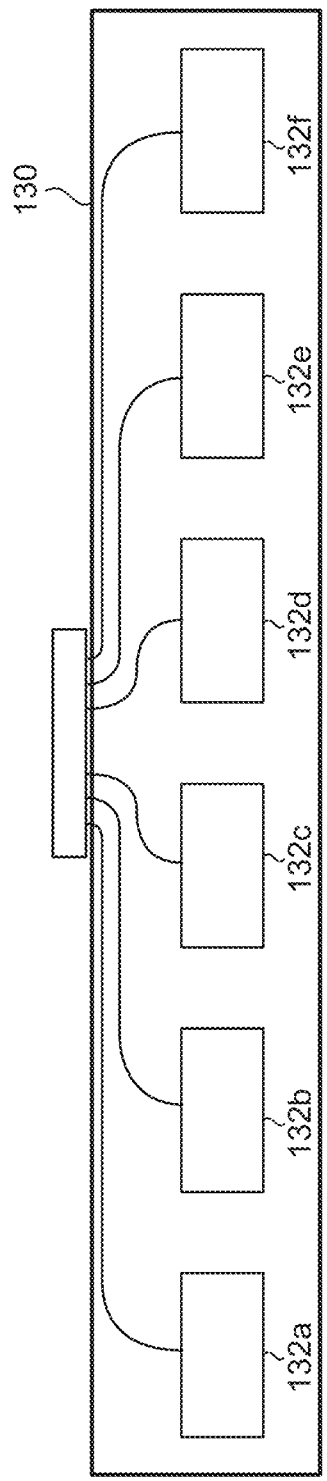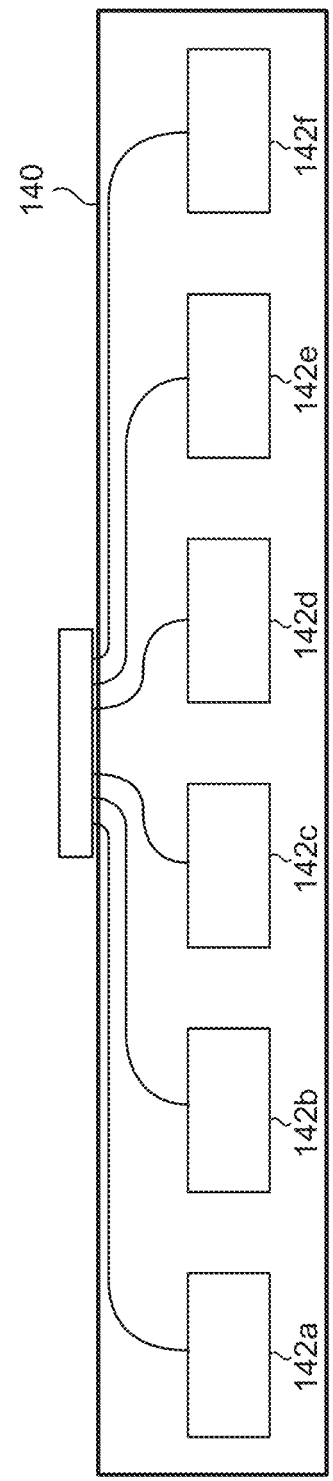

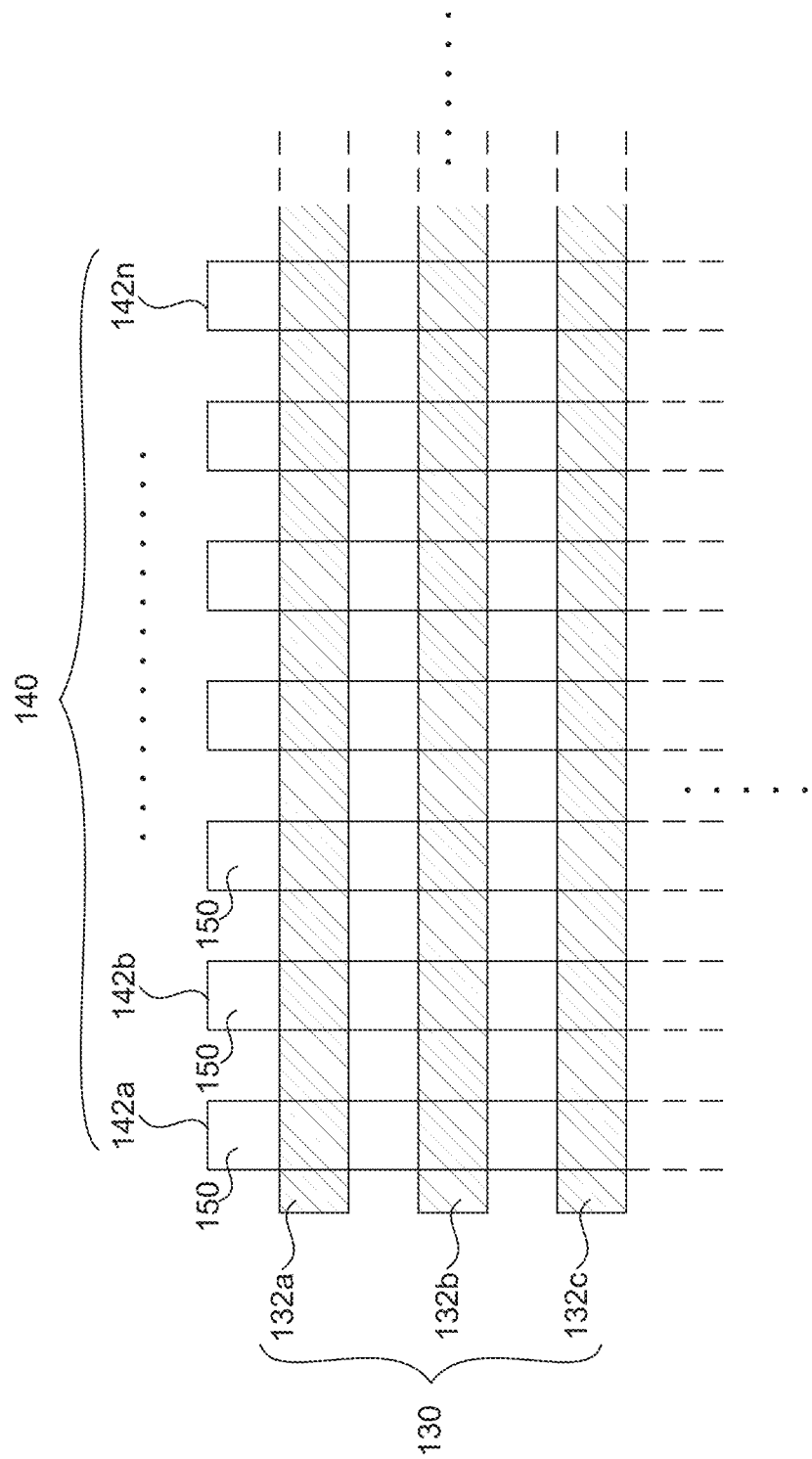

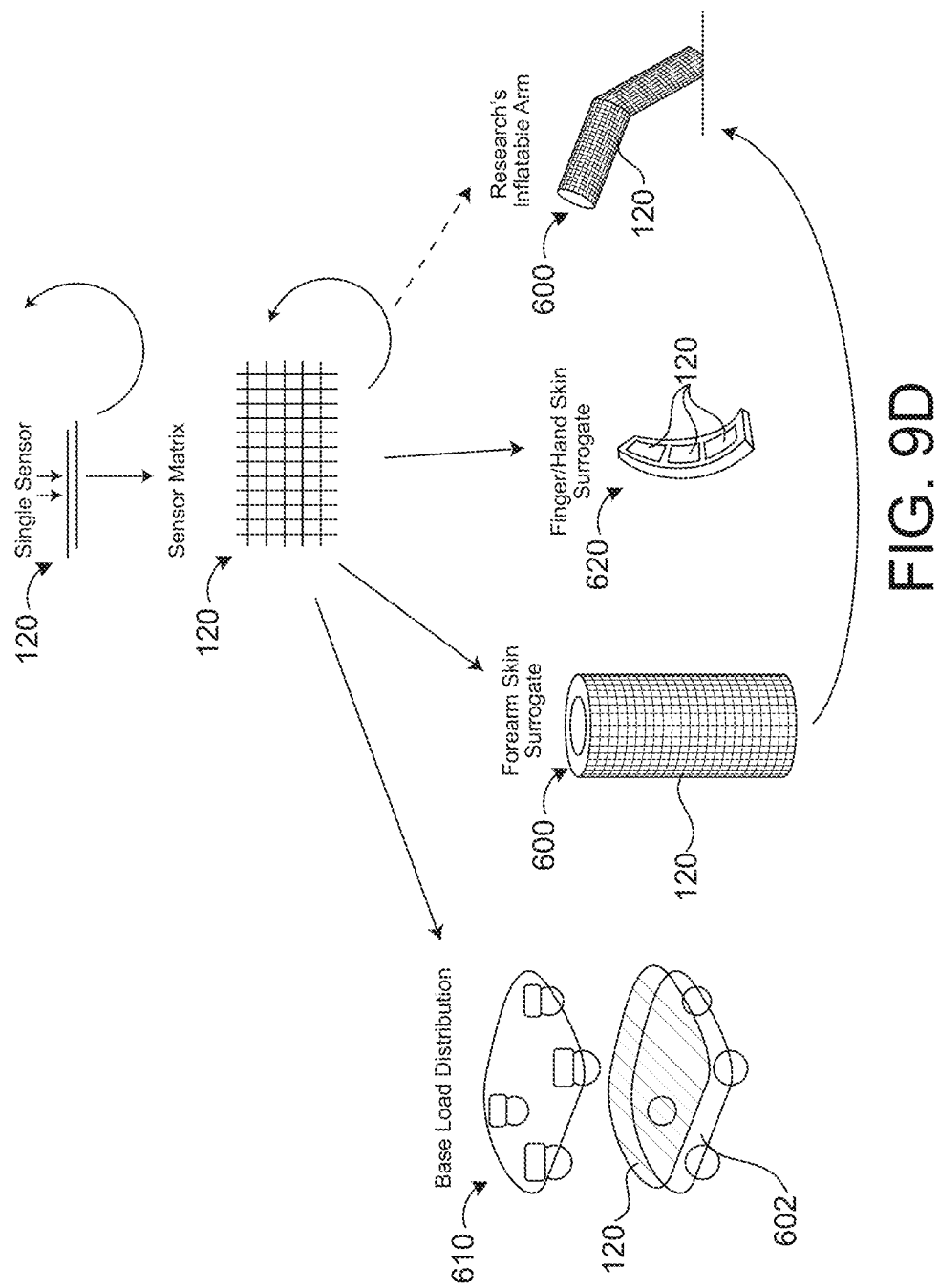

COMPLIANT SOLID-STATE BUMPER FOR ROBOT

CROSS REFERENCE TO RELATED APPLICATIONS

This U.S. patent application is a divisional of, and claims priority under 35 U.S.C. §121 from, U.S. patent application Ser. No. 13/803,617, filed on Mar. 14, 2013, which claims priority under 35 U.S.C. §119(e) to U.S. Provisional Application 61/611,550, filed on Mar. 15, 2012. The disclosures of these prior applications are considered part of the disclosure of this application and are hereby incorporated by reference in their entireties.

TECHNICAL FIELD

This disclosure relates to a tool for a robot to interact with its physical environment, allowing the robot to detect an impact with an object and to determine the degree or force of the impact, the location of the impact, and/or the direction of the impact. The present disclosure also provides a bumper to protect a robot from such impacts.

BACKGROUND

Historically, robot touch sensors are incorporated into a robot bumper assembly. Such bumper assemblies are rigid, movable bumpers that are spaced away and suspended from the robot chassis. Typically, such bumpers include a rigid outer shell suspended from the robot chassis by a series of hardware, such as pivots/bumper arms and coil springs. The springs absorb the impact energy, but require a high impact force, i.e., require that the bumper deflect by several millimeters to absorb the energy before triggering a switch to indicate that an impact event has occurred. The deflection of the rigid bumper relative to the robot's rigid chassis not only requires a swept volume to actuate, but creates visual seams and pinch points on the exterior. The use of the arms and springs require a number of moving parts that create mechanical mounting complexities and can lead to mechanical failure. The distance between the bumper and the robot creates a space in which dust and debris can collect.

Detecting the location of the impact is limited by the number of switches and suspension points that economically can be incorporated into the robot's mechanical geometry. For many robots, two switches, a left switch and a right switch, are used. At best, this allows for three detection zones, right, left, and center if both switches are triggered. The geometrical limitations in using such switches prevent the ability of the robot to detect when it is receiving pressure from above, such as in a wedging situation. Similarly, the robot cannot determine the degree or force of impact.

An alternative bumper design that does not employ complex mechanical mounting, utilizes carbon puck type contacts positioned around a front portion of the robot. Such a structure has several drawbacks. For example, the weight of the carbon puck bumper structure is heavy and changes the center of gravity of the robot. Additionally, the carbon puck bumper structure is expensive to manufacture and the appearance of the bumper is not uniform, making it less than aesthetically pleasing to a consumer.

SUMMARY

One aspect of the disclosure provides a robot bumper assembly including a bumper body, and first and second sensor arrays. The first sensor array is disposed along and contoured to the periphery of a forward facing portion of the bumper body. The first sensor array senses contact with an external environment at positions along the contour of the periphery forward facing portion of the bumper body. The second sensor array is disposed along and contoured to the periphery of a top portion of the forward facing portion of the robot body. The top portion is angled. ramping up. The second sensor array senses contact with an external environment at positions along the periphery of the angled top portion of the bumper body.

Implementations of the disclosure may include one or more of the following features. The first sensor array may extend vertically along the height of the forward facing portion of the bumper body. In some examples, the robot bumper further includes a third sensor array disposed along and contoured to the periphery of a forward facing portion of the bumper body. The third sensor array senses contact with an external environment at positions along the contour of the periphery of the forward facing portion of the bumper body. The third sensor may be spaced vertically apart from the first sensor array along the forward facing portion of the bumper body. The first and second sensor arrays may be pressure sensitive. Additionally or alternatively, the second sensor array may extend vertically along the height of the angled top portion of the bumper body. In some examples, the angled top portion is curved.

In some implementations, the robot bumper further includes a fourth sensor array. The fourth sensor array may be disposed adjacent the second sensor array along the periphery of the angled top portion of the forward facing portion of the bumper body. In addition, the fourth sensor array may be contoured to the surface of the angled top portion and may sense contact with an external environment at positions along the periphery of the angled top portion of the bumper body. The bumper body may define a substantially circular periphery or an at least partially square periphery.

In some examples, the robot bumper assembly may include a non-contact sensor array disposed on the forward facing portion of the bumper body. The non-contact sensor array may be vertically spaced between the first sensor array and second sensor array. The first and second sensors arrays may be membrane switches having first and second conductive layers separated by a separator layer.

Another aspect of the disclosure provides a robot including a robot chassis having a side edge defining a periphery of the robot chassis and a top edge. The robot includes a membrane switch for sensing an impact between the robot chassis and an external environment and a force transmission layer for transmitting energy from an impact between the robot chassis and an external environment to the membrane switch.

In some implementations, the membrane switch senses an impact on the side edge and the top edge of the robot chassis. Additionally, the membrane switch may have a first sensitivity along the side edge of the robot chassis and a second sensitivity along the top edge of the robot chassis. The first sensitivity may be greater than the second sensitivity. Additionally or alternatively, the membrane switch extends around an entirety periphery of the robot chassis. The robot chassis may have an approximately circular periphery or a partially square periphery. In some examples, the membrane switch includes first and second conductive layers separated by a separator layer.

Another aspect of the disclosure provides a robot bumper including a force absorption layer, a membrane switch layer having a plurality of electrical contacts, and a force transmission layer comprising a plurality of force transmitting elements configured to transmit force to the switch layer. In some examples, the membrane switch layer includes a first sheet having a plurality of electrical contact points and a second sheet having a plurality of electrical contact points. The switch layer may further comprise a separator layer positioned between the first and second sheets and for preventing accidental or incidental contact between the plurality of electrical contact points on the first and second sheets. Additionally or alternatively, the electrical contact points on the first sheet form a first pattern and the electrical contact points on the second sheet form a second pattern. In some examples, the first pattern and the second pattern are identical.

In some implementations, the plurality of electrical contact points on each sheet form a plurality of zones, each zone corresponding to an impact point on an external surface of the bumper. Additionally, each electrical contact point may form an individual zone.

In some examples, the force transmission layer is positioned between the force absorption layer and the membrane switch layer. The bumper may conform to a shape of a robot chassis.

Objects and advantages of the present disclosure will be set forth in part in the description which follows, and in part will be obvious from the description, or may be learned by practice of the present teachings. The objects and advantages of the present disclosure can be realized and attained by means of the elements and combinations particularly pointed out in the appended claim.

It is to be understood that both the foregoing general description and the following detailed description are exemplary and explanatory only and are not restrictive of the present teachings, as claimed.

The accompanying drawings, which are incorporated in and constitute a part of this specification, illustrate exemplary embodiments of the present teachings and together with the description, serve to explain the principles of those teachings.

DESCRIPTION OF DRAWINGS

FIGS. 5B and 5C are schematic views of exemplary conductive layers of a membrane switch assembly.

FIG. 9A is a schematic view of an exemplary conductive layer of a membrane switch assembly.

FIG. 9D is a schematic view of applying a membrane switch assembly in different robotic applications.

Like reference symbols in the various drawings indicate like elements.

DETAILED DESCRIPTION

Figure 1A:
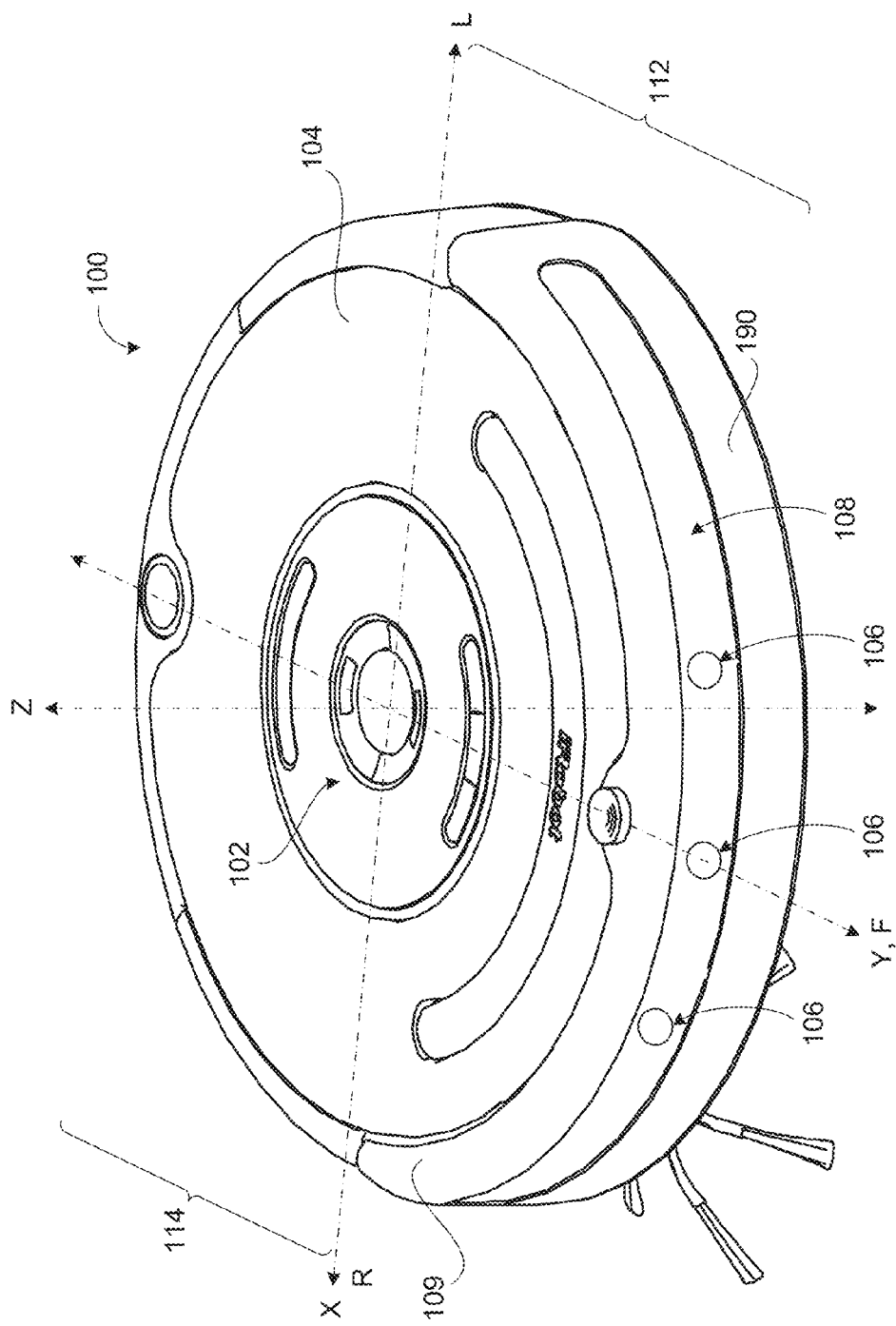
FIG. 1A is a front top perspective view of an exemplary robot.
Figure 1B:
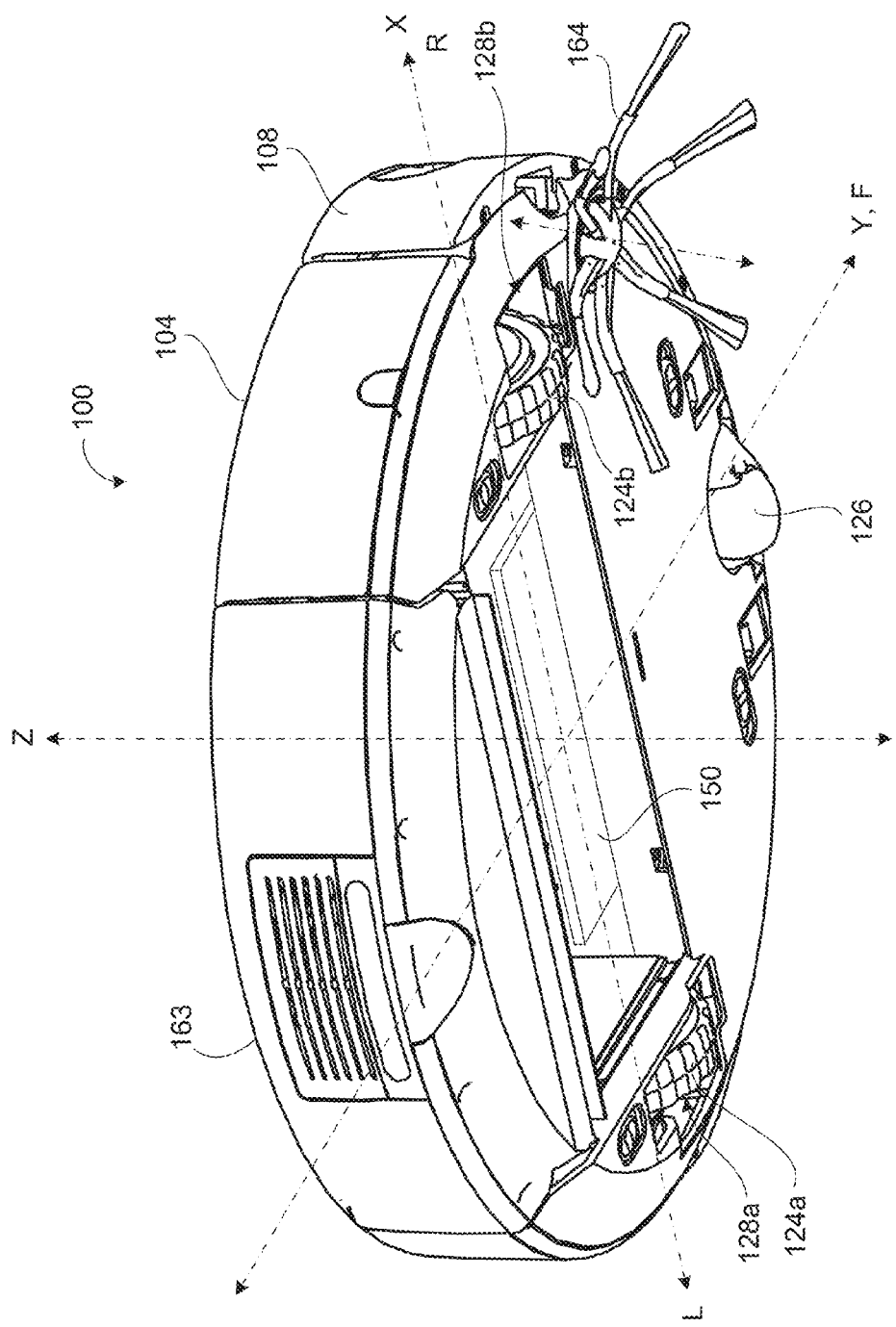
FIG. 1B is a rear bottom perspective view of the robot shown in FIG. 1A.
Figure 1C:
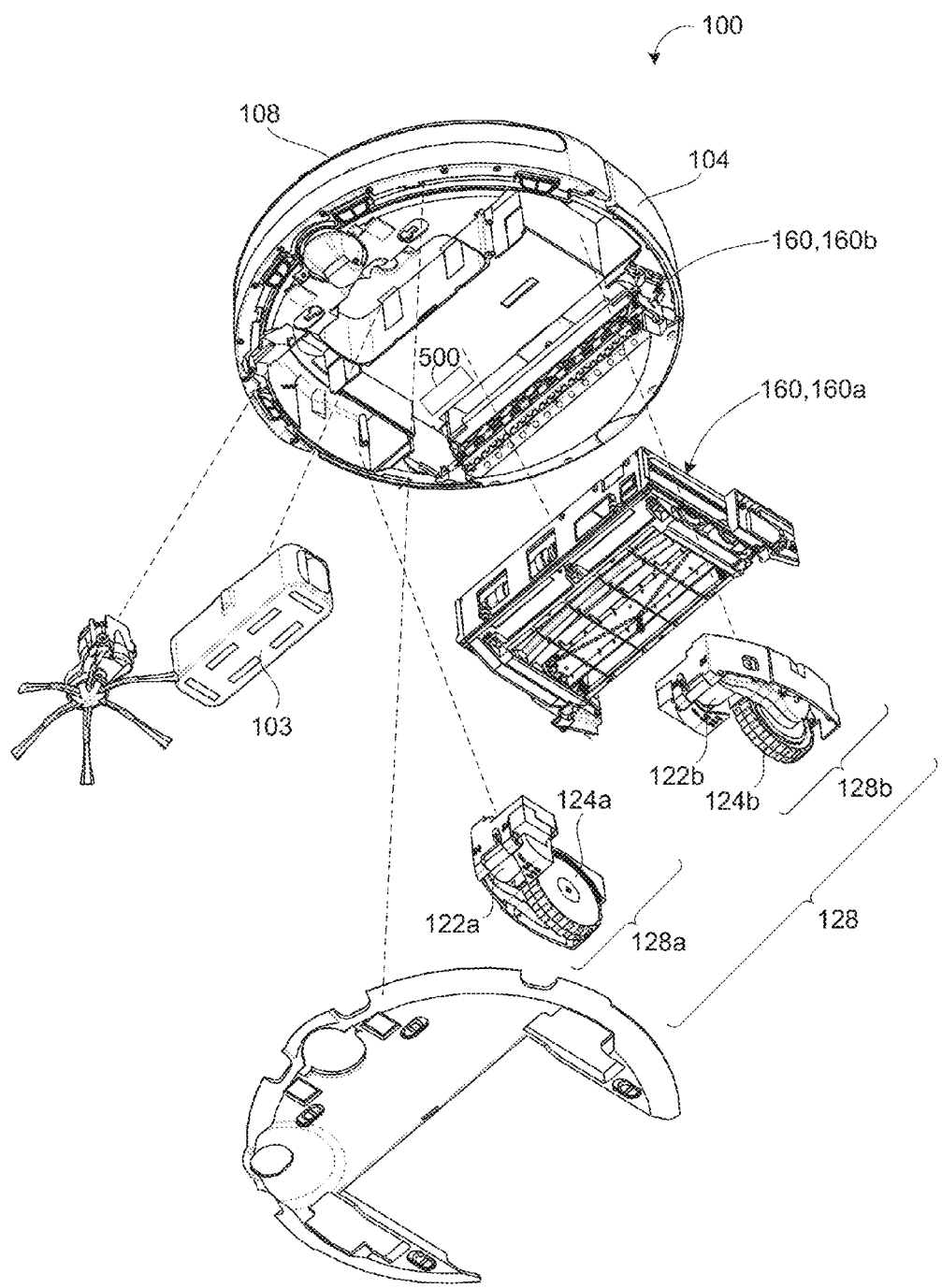
FIG. 1C is an exploded view of the robot shown in FIG. 1A.
Figure 1D:
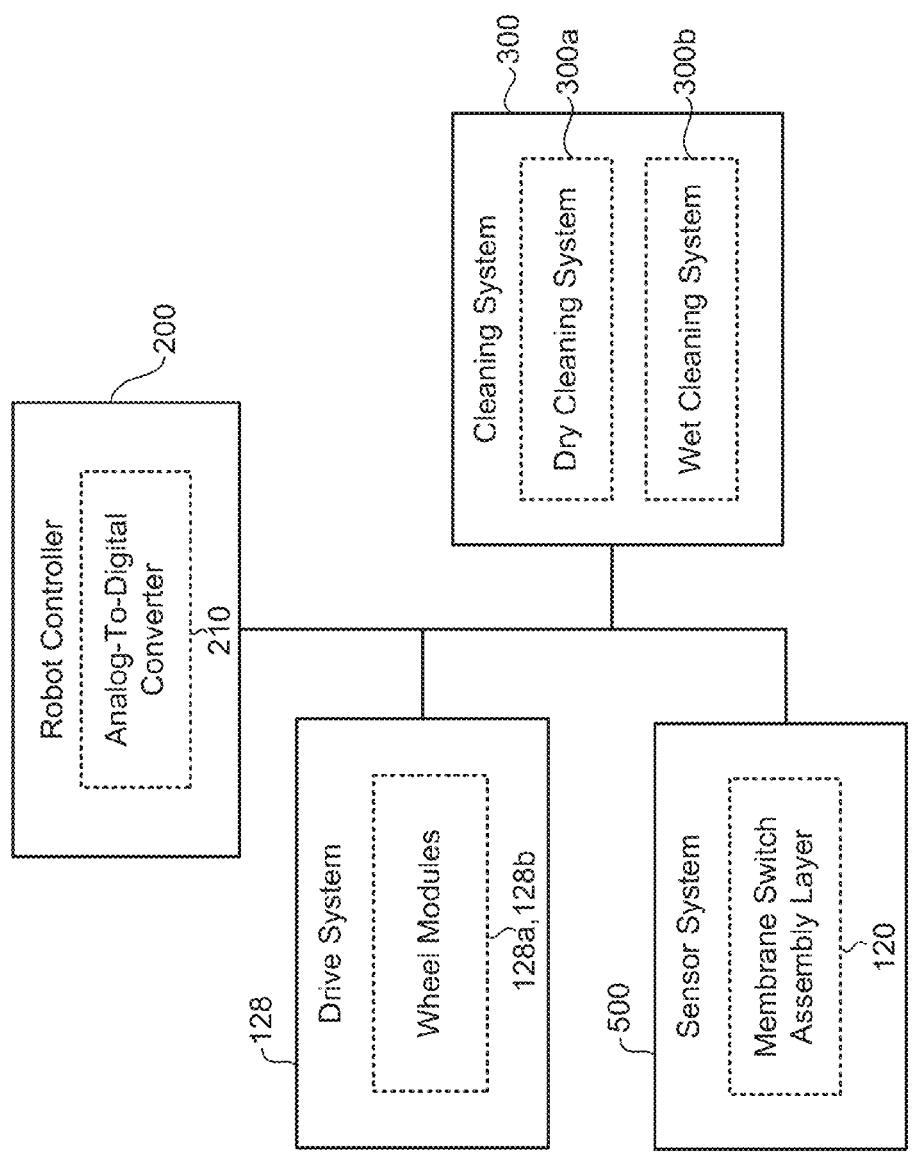
FIG. 1D is a schematic view of an exemplary robot.

Referring to FIGS. 1A-1D, in some implementations, a robot 100 includes a body 104 supported by a drive system 128 that can maneuver the robot 100 across a floor surface 10 based on a drive command having x, y, and θ components, for example, issued by a controller 200. The robot body 104 has a forward portion 112 and a rearward portion 114 carried by the body 104. The drive system 128 includes right and left driven wheel modules 128a, 128b. The wheel modules 128a, 128b are substantially opposed along a transverse axis X defined by the body 104 and include respective drive motors 122a, 122b driving respective wheels 124a, 124b. The drive motors 122a, 122b may releasably connect to the body 104 (e.g., via fasteners or tool-less connections) with the drive motors 122a, 122b optionally positioned substantially over the respective wheels 124a, 124b. The wheel modules 128a, 128b can be releasably attached to the chassis 104 and forced into engagement with the cleaning surface 10 by respective springs. The robot 100 may include a caster wheel 126 disposed to support a forward portion 112 of the robot body 104. The robot body 104 supports a power source 103 (e.g., a battery) for powering any electrical components of the robot 100.

The robot 100 can move across the surface 10 through various combinations of movements relative to three mutually perpendicular axes defined by the body 104: a transverse axis X; a fore-aft axis Y; and a central vertical axis Z. A forward drive direction along the fore-aft axis Y is designated F (sometimes referred to hereinafter as "forward"), and an aft drive direction along the fore-aft axis Y is designated A (sometimes referred to hereinafter as "rearward"). The transverse axis X extends between a right side R and a left side L of the robot 100 substantially along an axis defined by center points of the wheel modules 128a, 128b.

In some implementations, the robot 100 includes a cleaning system 300 for cleaning or treating the floor surface 10. The cleaning system 300 may include a dry cleaning system 300a and/or a wet cleaning system 300b.

A user interface 102 may be disposed on a top portion of the body 104 receives one or more user commands and/or displays a status of the robot 100. The user interface 102 is in communication with the robot controller 200 such that one or more commands received by the user interface 102 can initiate execution of a cleaning routine by the robot 100.

The robot controller 200 (e.g., executing on a computing processor) may execute behaviors that cause the robot 100 to take an action, such as maneuvering in a wall following manner, a floor scrubbing manner, or changing its direction of travel when an obstacle is detected. The robot controller 200 can maneuver the robot 100 in any direction across the surface 10 by independently controlling the rotational speed and direction of each wheel module 128a, 128b. For example, the robot controller 200 can maneuver the robot 100 in the forward F, reverse (aft) A, right R, and left L directions. The robot controller 200 may direct the robot 100 over a substantially random (e.g., pseudo-random) path while traversing the cleaning surface 10. The robot controller 200 can be responsive to one or more sensors (e.g., bump, proximity, wall, stasis, and cliff sensors) disposed about the robot 100. The robot controller 200 can redirect the wheel modules 128a, 128b in response to signals received from the sensors, causing the robot 100 to avoid obstacles and clutter while maneuvering the surface 10. If the robot 100 becomes stuck or entangled during use, the robot controller 200 may direct the wheel modules 128a, 128b through a series of escape behaviors so that the robot 100 can escape and resume normal cleaning operations.

In some implementations, to achieve reliable and robust autonomous movement, the robot 100 includes a sensor system 500 supported by the robot body 104 and having one or more types of sensors 505, which can be used to create a perception of the robot's environment sufficient to allow the robot 100 to make intelligent decisions about actions to take in that environment. The sensor system 500 may include obstacle detection obstacle avoidance (ODOA) sensors, communication sensors, navigation sensors, etc. These sensors may include, but are not limited to, proximity sensors, contact sensors, a camera (e.g., volumetric point cloud imaging, three-dimensional (3D) imaging or depth map sensors, visible light camera and/or infrared camera), sonar, imaging sonar, radar, LIDAR (Light Detection And Ranging, which can entail optical remote sensing that measures properties of scattered light to find range and/or other information of a distant target), LADAR (Laser Detection and Ranging), ranging sonar sensors, a laser scanner, etc.

A forward portion 112 of the body 104 carries a bumper assembly 108, which detects (e.g., via one or more sensors) one or more events in a drive path of the robot 100, for example, as the wheel modules 128a, 128b propel the robot 100 across the cleaning surface 10 during a cleaning routine. The robot 100 may respond to events (e.g., obstacles, cliffs, walls) detected by the bumper assembly 108 by controlling the wheel modules 128a, 128b to maneuver the robot 100 in response to the event (e.g., away from an obstacle). The bumper assembly 108 provides a sensing capability and thus feedback when the robot comes into physical contact with the external environment. Additionally, the bumper assembly 108 protects the elements of the robot 100 from impact forces caused by such physical contact. While some sensors are described herein as being arranged on the bumper assembly 108, these sensors can be additionally or alternatively arranged at any of various different positions on the robot 100.

Figure 2A:
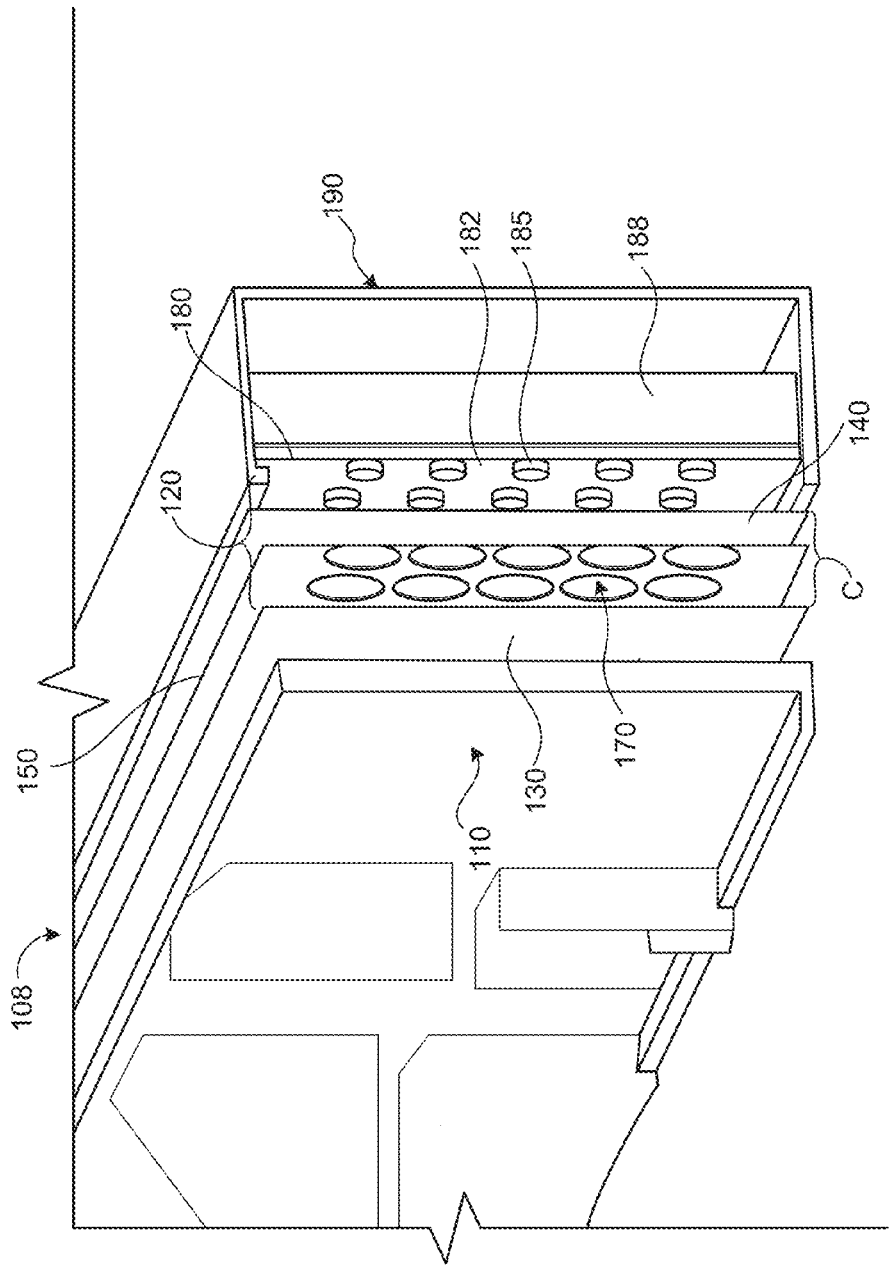
FIG. 2A is an exploded cross-sectional view of an exemplary bumper assembly.
Figure 2B:
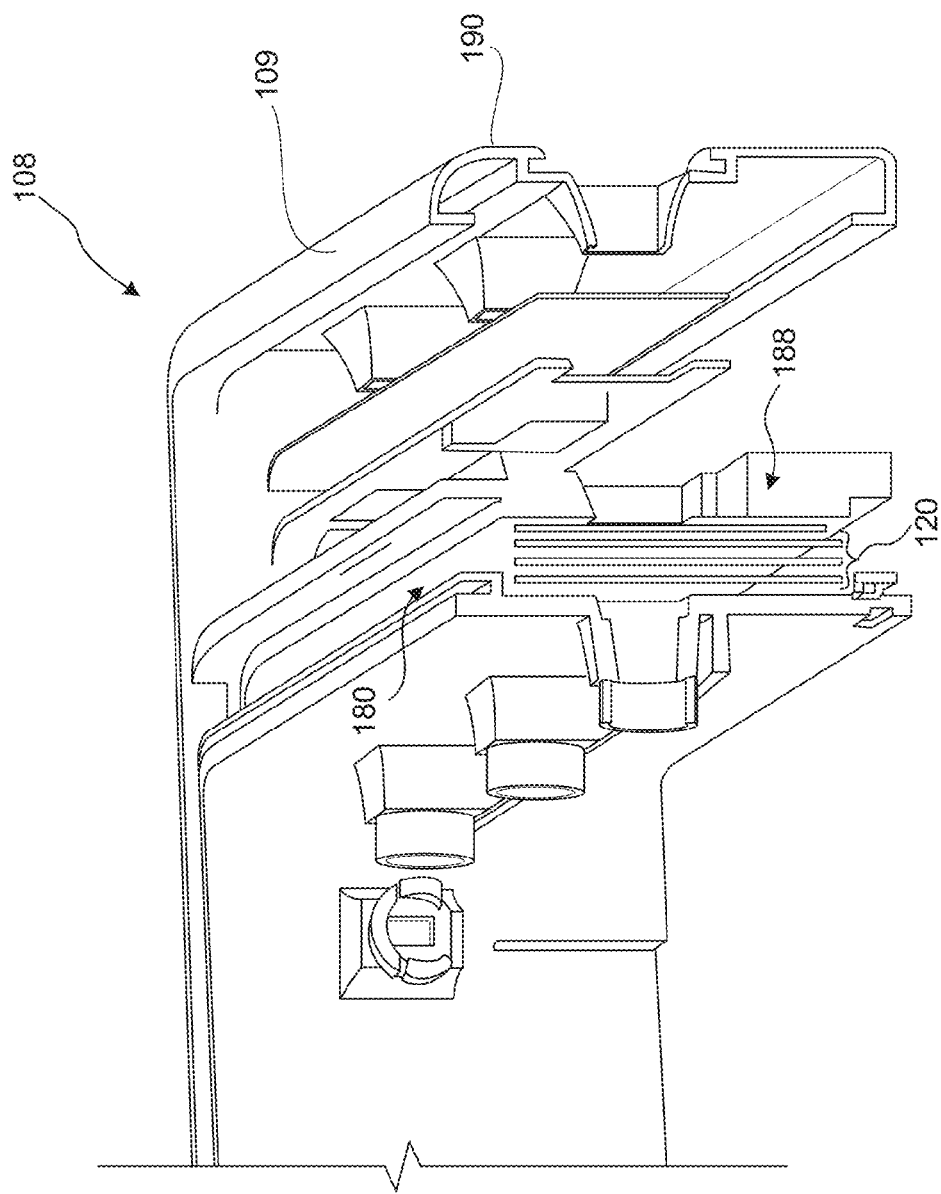
FIG. 2B is an exploded cross-sectional view of another exemplary bumper assembly.

Referring to FIG. 2A, the bumper assembly 108 may include several layers disposed on each other. The layers include an innermost layer 110 (also referred to as an internal frame layer), a sensing layer 120 (also referred to as a membrane switch assembly layer), a force transmitting layer 185 (also referred to as an activation layer), a force absorbing layer 188 (also referred to as a shock absorbing layer), and an external layer 190 (also referred to as an outer protective layer). The bumper assembly 108 may not include all of the above layers, or alternatively, some of the elements of the above layers may be incorporated into a single layer. The sensing system 500 may include the membrane switch assembly layer 120, which may provide contact signals to the controller 200.

Figure 3:
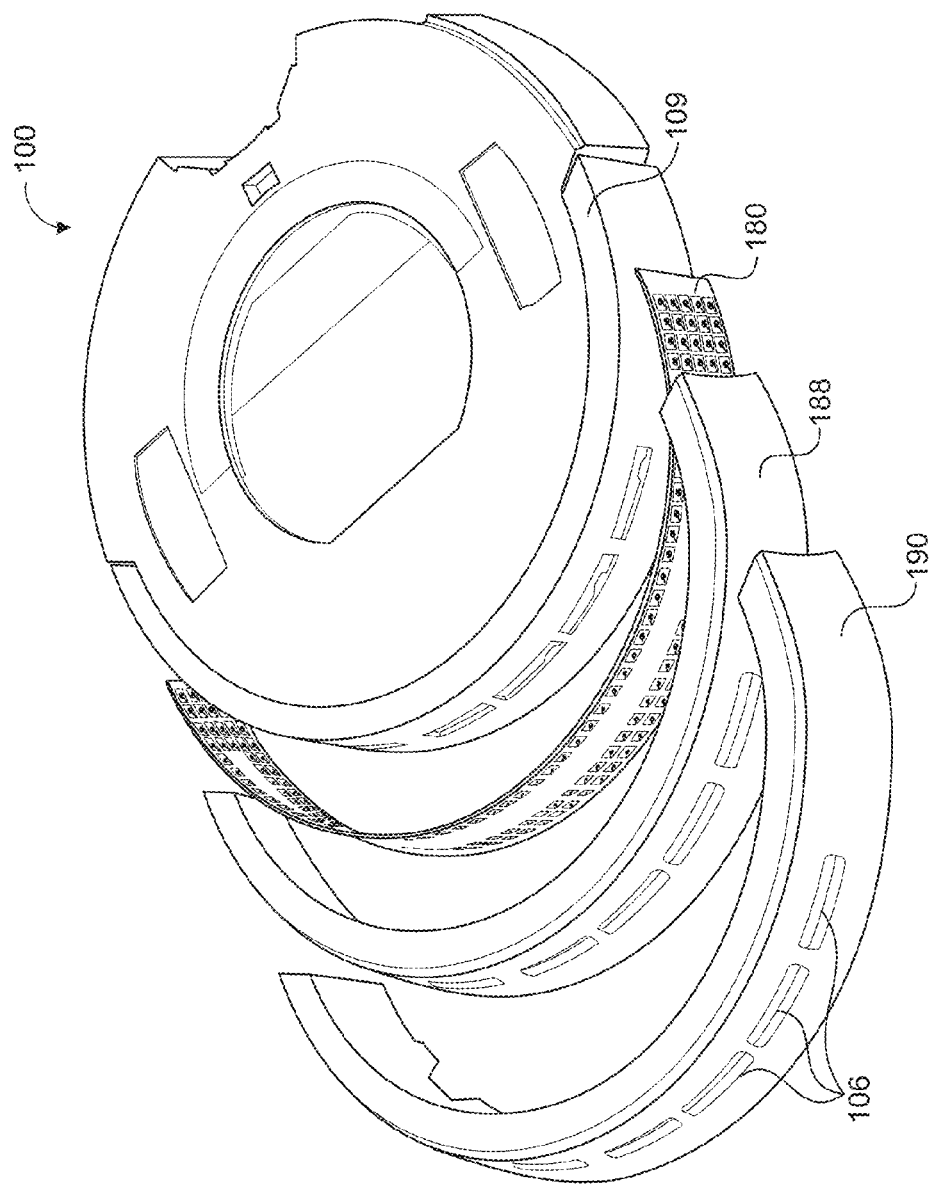
FIG. 3 illustrates an exploded perspective view of an exemplary bumper assembly on a robot.

As shown in FIG. 2A, the innermost layer 110 (also referred to as the forward facing portion of the robot body 107) may be an inner solid wall 110 of the bumper assembly 108 formed by a chassis 104 of a robot 100 on which the bumper assembly 108 is coupled or mounted, or may be a separate component of the bumper assembly 108. The wall 110 may be made of a rigid plastic, e.g., an ABS (acrylonitrile butadiene styrene) material, and formed to provide a smooth surface against which the sensing layer 120 may be positioned. ABS is a type of polymer that becomes bendable when it reaches a specific temperature. When ABS cools it goes back to its solid state. The smoothness of the surface reduces the potential for erroneous actuation of the sensing layer 120. Only the portions of the innermost layer 110 that will come into contact with the sensing layer 120 provide a smooth surface for positioning adjacent the sensing layer 120. For example, if the robot chassis 104 includes windows or openings 106 in an area that receives the bumper assembly 108, both the innermost layer 110 and any additional layers of the bumper assembly 108, such as the sensing layer 120, can include openings 106 that correspond to the chassis openings 104, as shown in FIG. 3.

Referring again to FIG. 1, in some implementations, the sensing or membrane switch assembly layer 120 includes three layers, a first conductive layer 130, a second conductive layer 140, and an intervening separation layer 150 positioned between the first and second conductive layers 130, 140. Each of the first and second conductive layers, 130, 140 as well as the separation layer 150 may be made of a flexible material such as polyethylene terephthalate (PET) or indium tin oxide (ITO).

Referring to FIGS. 4A-4E, each conductive layer 130, 140 may form a flexible substrate that includes a plurality of electrical contacts 160a, 160b, respectively. As shown in FIGS. 5A-5C and 7, the electrical contacts 160a, 160b may form part of a circuit 165 provided on each flexible conductive layer 130, 140. The circuit 165 including electrical contacts 160a, 160b on each conductive layer 130, 140 may be a circuit printed on the flexible substrate 130, 140. Each conductive layer 130, 140 may include, for example, a polyester film screen-printed with a conductive ink such as copper, silver, or graphite. Other types of materials suitable for printed circuits, as known in the art, may be used to form first and second conductive layers 130, 140.

In some implementations, the separation layer 150 is a layer of dielectric ink. The dielectric ink layer 150 may be printed directly on one of the conductive layers 130, 140 to act as an insulator between the two conductive layer 130, 140. This creates a controllable clearance gap C between the first and second conductive layers 130, 140 based on the thickness and number of layers of the dielectric ink that are printed. Having a dielectric ink as the separation layer 150 eliminates the need to use an insulating film to create the gap. The location, spacing, shape, and thickness of the dielectric ink layer may be adjusted to tune the activation force of the switch in various regions of the bumper assembly 108.

Figure 4A:
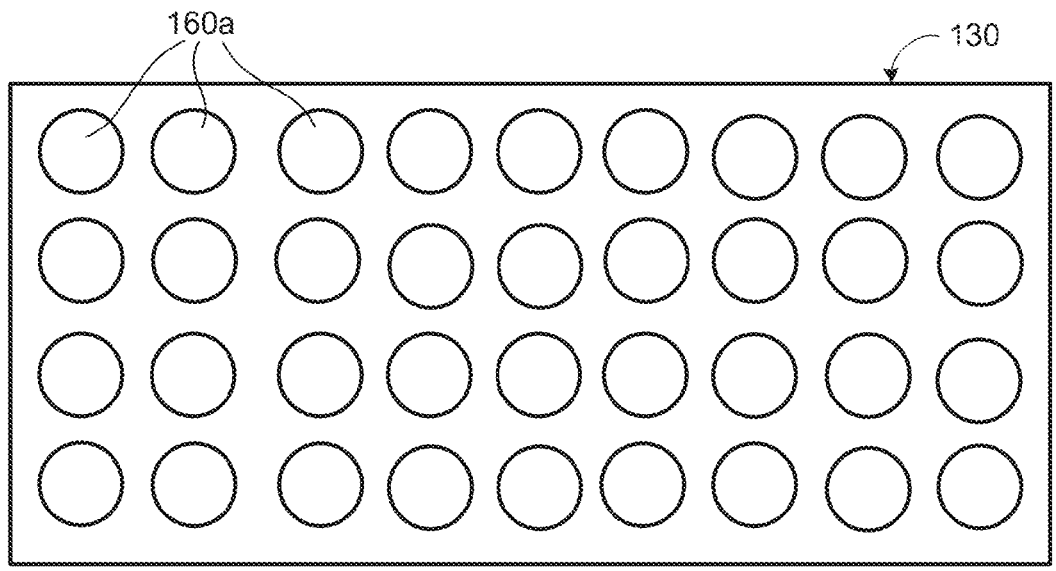
FIG. 4A is a front view of an exemplary first conductive layer of a membrane switch assembly of a bumper.
Figure 4B:
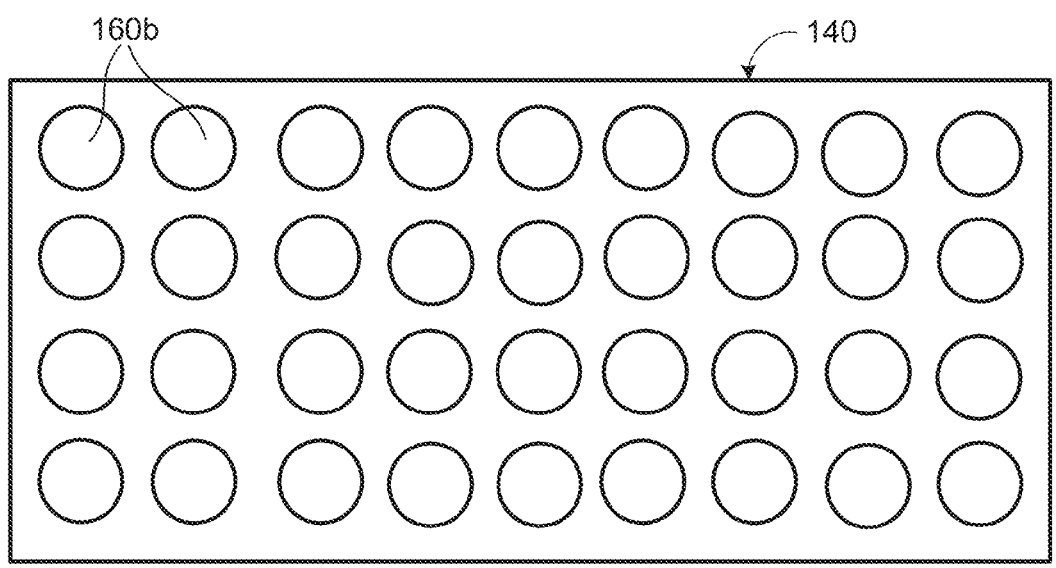
FIG. 4B is a front view of an exemplary second conductive layer of a membrane switch assembly of a bumper.
Figure 4C:
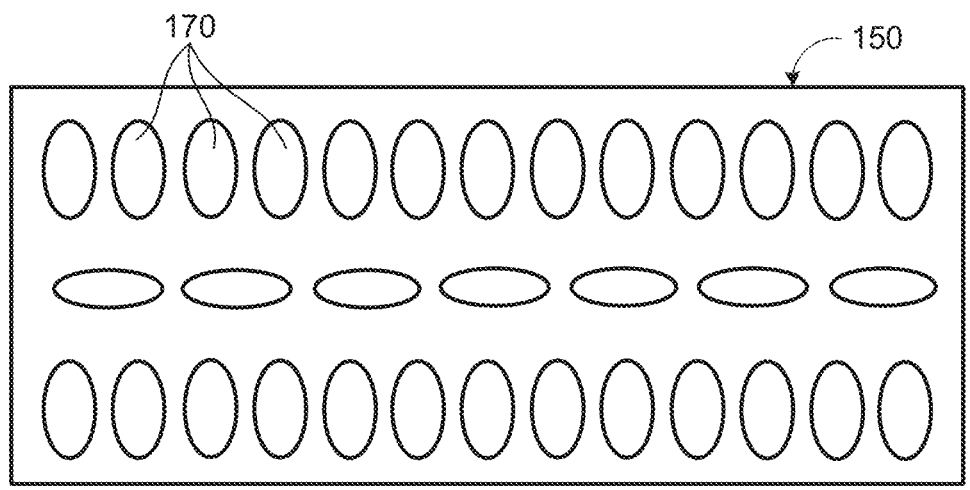
FIG. 4C is a side view of an exemplary separator layer of a membrane switch assembly of a bumper.
Figure 4D:
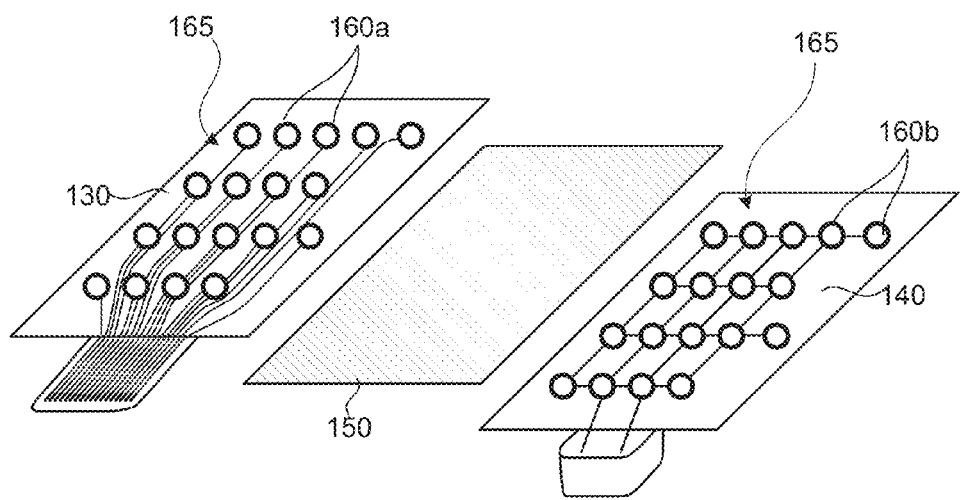
FIG. 4D is a perspective view of an exemplary separator layer of a membrane switch assembly separating first and second conductive layers.
Figure 4E:
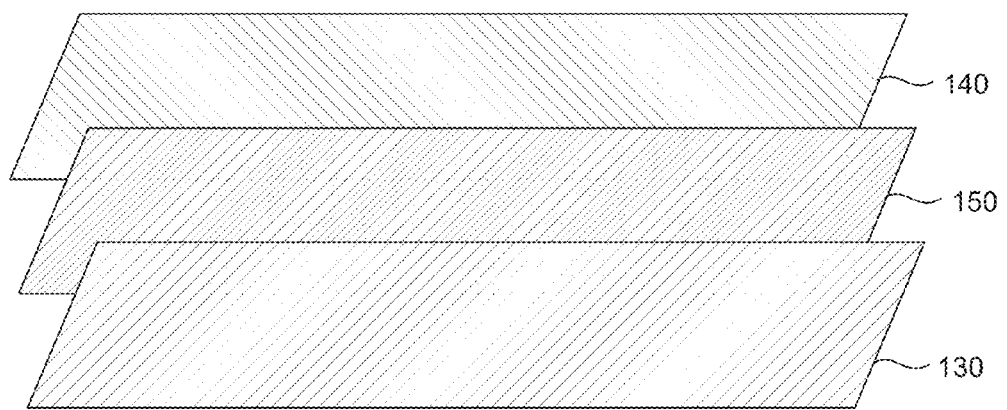
FIG. 4E is a perspective view of an exemplary separator layer of a membrane switch assembly separating first and second conductive layers.
Figure 6A:
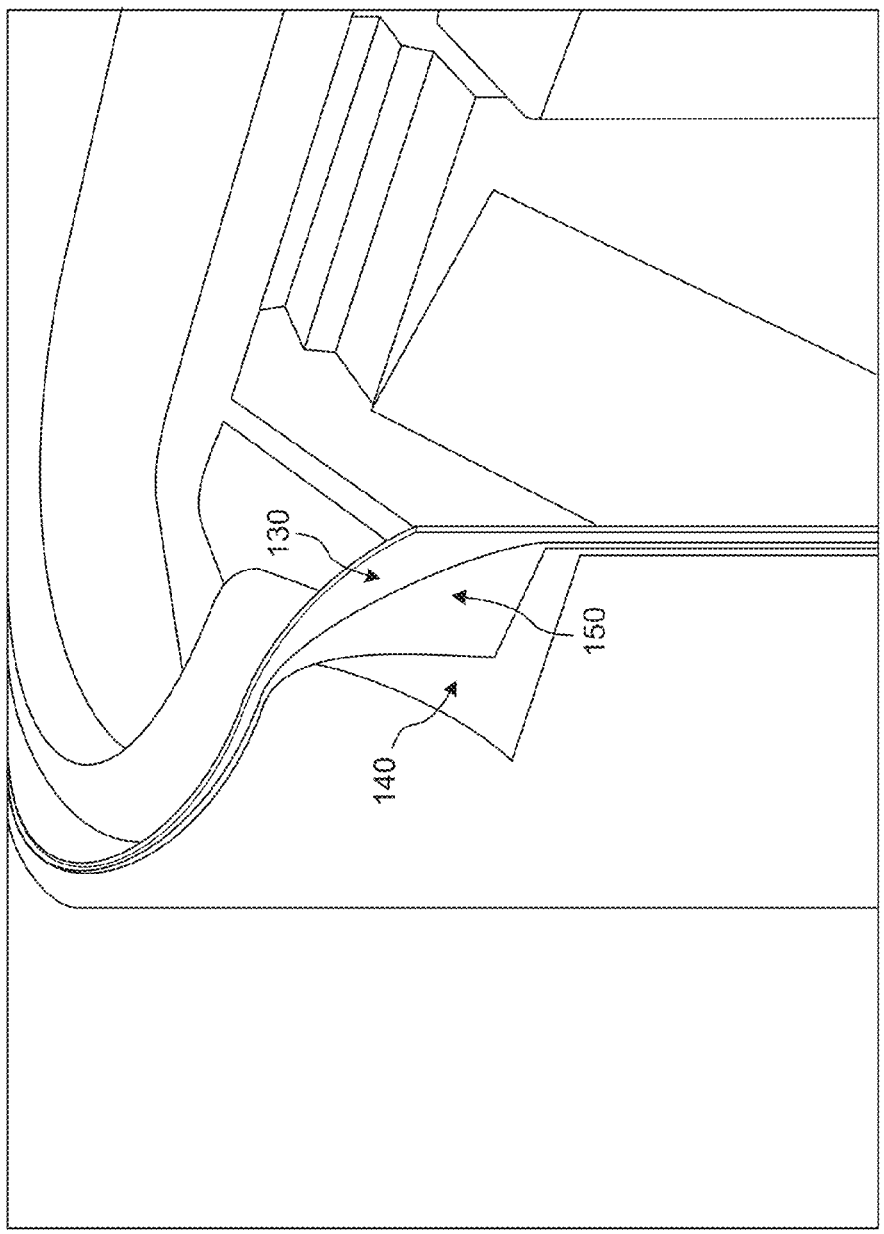
FIG. 6A is a perspective view of an exemplary membrane switch assembly of a bumper.

As shown in FIGS. 4D and 6A, the electrical contacts 160a, 160b formed on the first and second conductive layers 130, 140 may face one another, separated by separation layer 150.

When an electrical contact 160a on first conductive layer 130 is brought into contact with an electrical contact 160b on second conductive layer 140, the switch is "ON" and when contact is broken, the switch is "OFF." The membrane switch assembly 120 may be connected and transmit signals to the controller 200 (e.g., a computing processor) to indicate when and where an impact is detected. The controller 200 may be configured to detect and recognize size, location, and number of impacts. The impacts may be identified by zone, for example, front, rear, side, top, etc. or by a matrix.

Referring again to FIGS. 2A and 4C, in some implementations, the electrical contacts 160a on the first conductive layer 130 are separated from the electrical contacts 160b on the second conductive layer 140 by the separation layer 150. The separation layer 150 may define a plurality of openings 170 through which the electrical contacts 160a on the first conductive layer 130 may be brought into contact with the electrical contacts 160b on the second conductive layer 140.

The sensitivity of the sensing or membrane switch assembly layer 120 may be controlled, in part, by the density of the electrical contacts 160a, 160b provided on the first and second conductive layers 130, 140. As shown in FIGS. 4A and 4B, each conductive layer 130, 140 may include the same number of electrical contacts 160a, 160b or a differing number of electrical contacts 160a, 160b. The electrical contacts 160a, 160b may be identically patterned on first and second conductive layers 130, 140 or may have different patterns, sizes, and shapes. The greater the number of opportunities for the electrical contacts 160a on the first conductive layer 130 to come into contact with the electrical contacts 160b on the second conductive layer 140, the more sensitive the membrane switch assembly 120. Similarly, the size, shape, and position of the openings 170 in separation layer 150 controls the number of places (or opportunities) that contact may occur between the electrical contacts 160a on conductive layer 130 to come into contact with the electrical contacts 160b on the second conductive layer 140. Each opening 170 in separation layer 150 provides an opportunity for contact between the electrical contacts 160a on the first conductive layer 130 and the electrical contacts 160b on the second conductive layer 140.

In some implementations, the first and second conductive layers 130, 140, (e.g., printed circuit boards (PCB)), are heat stabilized polyester films screen printed with a silver printed circuit. The first and second conductive PCB layers 130, 140 are 0.127 mm thick. The separation layer 150 (with opening 170 in it) is a membrane switch spacer having a thickness of 0.0254 mm. Each of the three layers (first and second conductive layers 130, 140, and separator layer 150) defines alignment holes to align them relative to one another. The innermost conductive layer 130 may be glued to the innermost layer 110 (e.g., a plastic wall) and the three layers 130, 140, 150 of the sensing layer 120 can be attached using double-sided tape. It is also possible to manufacture the two conductive layers (PCBs) 130, 140 and the separator layer 150 as a sealed unit.

Figure 5A:
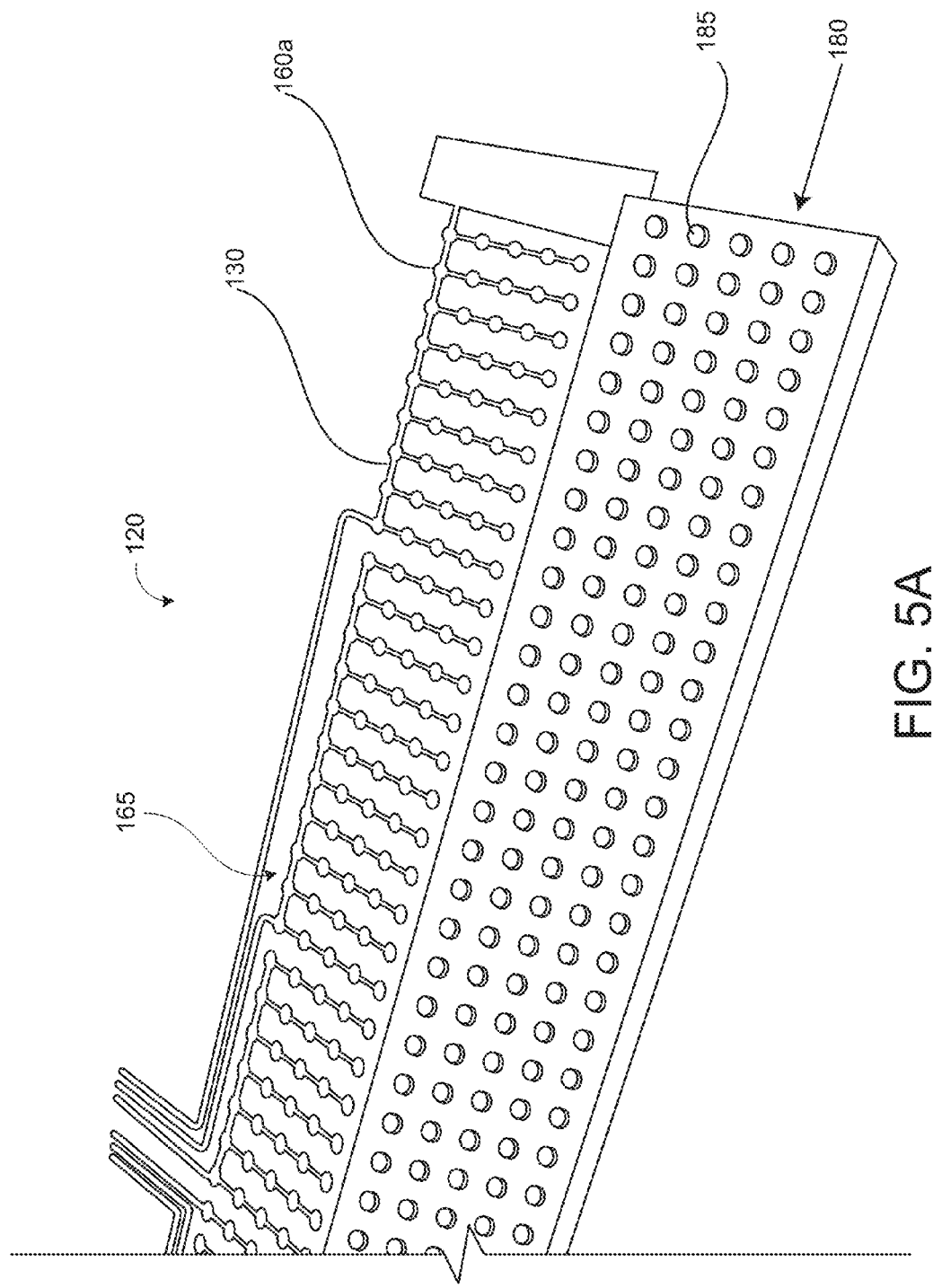
FIG. 5A is a perspective view of an exemplary conductive layer of a membrane switch assembly and a force transmitting layer of a bumper assembly.

Compressing the first and second conductive layers 130, 140 together results in an electrical connection when electrical contacts 160a, 160b come into contact with one another. The extent or number of contacts made when the first and second conductive layers 130, 140 are compressed together may be representative of the size or force of the impact on the bumper assembly by the external environment. The amount of contact may be determined by the contact points 160a, 160b or by zones 132a-n, 142a-n. For example, as shown in FIGS. 5A and 5B, the first and second conductive layers 130, 140 each include electrical contacts 160a, 160b identically positioned and divided into six different zones 132a-f, 142a-f. Alternatively, if the electrical contacts 160a, 160b are connected vertically (e.g., six zones 132a-f) on one conductive layer 130 and horizontally (e.g., six zones 142a-f) on the other conductive layer 140, a simple x-y map of potential zones (e.g., 36 zones) where a contact is taking place is possible without any increase in the number of electrical contacts 160a, 160b. This allows a finer localization of impact points. The concept also may be implemented such that multiple zones 132a-f, 142a-f are read simultaneously, allowing the bumper assembly 108 to act as a multi-touch sensor, and as a measure of the force of the impact by the number of zones 132a-f, 142a-f simultaneously triggered. In some examples, the zones 132a-f, 142a-f of the conductor layers 130, 140 each has a height of 1.8 inches. Additionally, the first zone 132a, 142a and the sixth zone 132f, 142f may each have a width of 3.5 inches. The second zone 132b, 142b and the fifth zone 132e, 142e may each have a width of 4.2 inches. Finally, the third zone 132c, 142c and the forth zone 132d, 142d may each have a width of 3.05 inches.

In some implementations, referring to FIG. 4D, the separation layer 150 is made of piezoresistive material. When pressure is applied to piezoresistive material, the piezoresistive material experiences a change in resistance. Such a change in resistance causes changes in inter-atomic spacing making it easier for the conductive band to conduct electrons. The movement of electrons results in a change in the resistivity of the piezoresistive material. Piezoresistivity is measures based on the following equation:

$$\rho_\sigma = \frac{\left(\frac{\delta\rho}{\rho}\right)}{\varepsilon} \quad (1)$$

where $\rho_\sigma$ is the piezorisistivity, $\delta\rho$ is the change in resistivity, $\rho$ is the original resistivity, and $\in$ is the strain. The two conductive layers 130, 140 sandwich the piezoresistive material that forms the separation layer 150. In some examples, an outer shock or force absorbing layer 188 made of rubber or neoprene is used to distribute force and limit concentrated impact. Piezoresistive materials that may be used include, but are not limited to, Velostat by 3M and Linqstat by Caplinq. The piezoresistive material as the separation layer 150 aids in determining the pressure applied to a specific zone of the bumper assembly 108; requiring less mechanical travel, is calibrate-able, and may be less susceptible to mechanical fatigue.

Adjacent and exterior to the membrane switch assembly layer 120 is a force transmitting or activation layer 180. The force transmitting layer 180 may be made of a urethane foam material designed to resist permanent compression set. An example of a suitable material is Poron® urethane foam. The force transmitting layer 180 may have a thickness that ranges between about 5/16" and about 3/16", and may have a thickness of approximately 0.5 mm. As shown in FIGS. 2A, 3, 5 and 7, the force transmitting layer 180 includes a plurality of force transmitting elements 185. The force transmitting elements 185 are small protrusions extending from a surface 182 of the force transmitting layer 180 and are positioned adjacent to the membrane switch assembly layer 120. The size and shape of the force transmitting elements 185 may vary as necessary to transmit a force applied to the bumper assembly 108 to the membrane switch assembly layer 120 through the force transmitting layer 180 via force transmitting elements 185. Additionally, the stiffness of the foam making up the force transmitting layer 180 and elements 185 may be increased or decreased to further vary the sensitivity of the membrane switch assembly layer 120. Such variations in the stiffness of the foam and the dimensions of the force transmitting elements 185 can be used to calibrate the amount of force necessary to actuate the membrane switch assembly layer 120. For example, the membrane switch assembly layer 120 may be actuated by a force between about 0.5 lbs and about 0.15 lbs. A small force such as 0.25 lbs is sufficient to indicate an impact with the external environment but will not stop the robot 100 for incidental contact, such as with, for example, a bed skirt, but the force sensitivity can be tuned higher or lower based on capabilities of the membrane switch layer 120.

The number of force transmitting elements 185 may be the same as the number of potential electrical contact points 160a, 160b between the first and second conductive layers 130, 140. The force transmitting elements are sizable and positionable to be aligned with each electrical contact 160a, 160b on the first and second conductive layers 130, 140 of membrane switch assembly layer 120. For example, the force transmitting elements 185 may be round and have a diameter equal to a diameter of electrical contracts 160a, 160b. For example, the force transmitting elements 185 may have a diameter of 8 mm and a height of 1.25 mm. Thus, the force transmitting elements 185 serve to channel a portion of impact energy to the contact points of the membrane switch assembly layer 120. When such energy is transmitted to the membrane switch assembly layer 120 and is sufficient to place at least one electrical contact 160a of first conductive layer 130 into contact with at least one electrical contact 160b of second conductive layer 140, the membrane switch is "ON" for the duration of the contact.

Similar to the force transmitting layer 180, the shock or force absorbing layer 188 may be fabricated from a urethane foam material designed to resist permanent compression set. An example of a suitable material is Paron® urethane foam. Additional exemplary materials include EVA foam (Core material), a polyurethane elastomeric. Shock absorbing layer 188 may have a thickness suitable to absorb a significant portion of the force from an impact of the bumper 108 with the external environment in order to protect the chassis 104 of the robot 100. In particular, the bumper 108 should absorb the full impact of the collision to protect the robot 100 from impact forces as the robot 100 moves at a top speed of 1 ft/sec, and it should reduce and/or eliminate the noise from such impact. In some examples, the shock or force absorbing layer 188 may be integrated with the force transmitting layer 180.

In some implementations, the exterior of the bumper assembly 108 is provided with an outer protective layer or coating 190. The outer protective layer 190 may form an abrasion-resistant skin that serves to protect the bumper assembly 108 from wear, cuts, and punctures. Any suitable elastomeric material, for example a reinforced vinyl material, may be used. The outer protective layer 190 may have a thickness of, for example, about 1 mm. The outer protective layer 190 may be formed integrally with the shock or force absorbing layer 188. In such implementation, the shock or force absorbing layer 188 may be made of a polyurethane foam and covered with a polyurethane skin. An example of an appropriate material is a polyurethane manufactured and used by Vibram®.

Figure 6B:
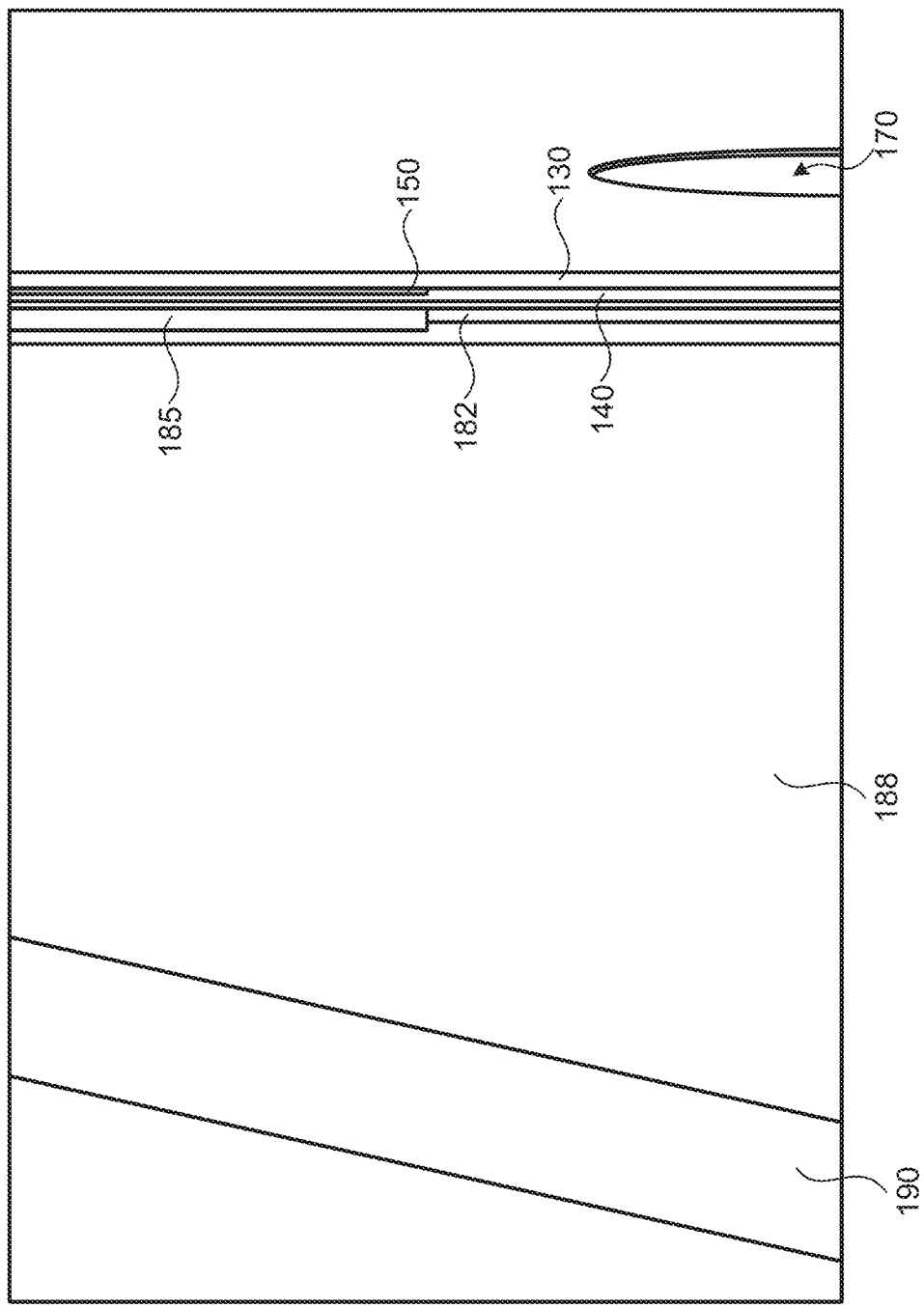
FIG. 6B is a section view of an exemplary membrane switch assembly of a bumper.
Figure 7:
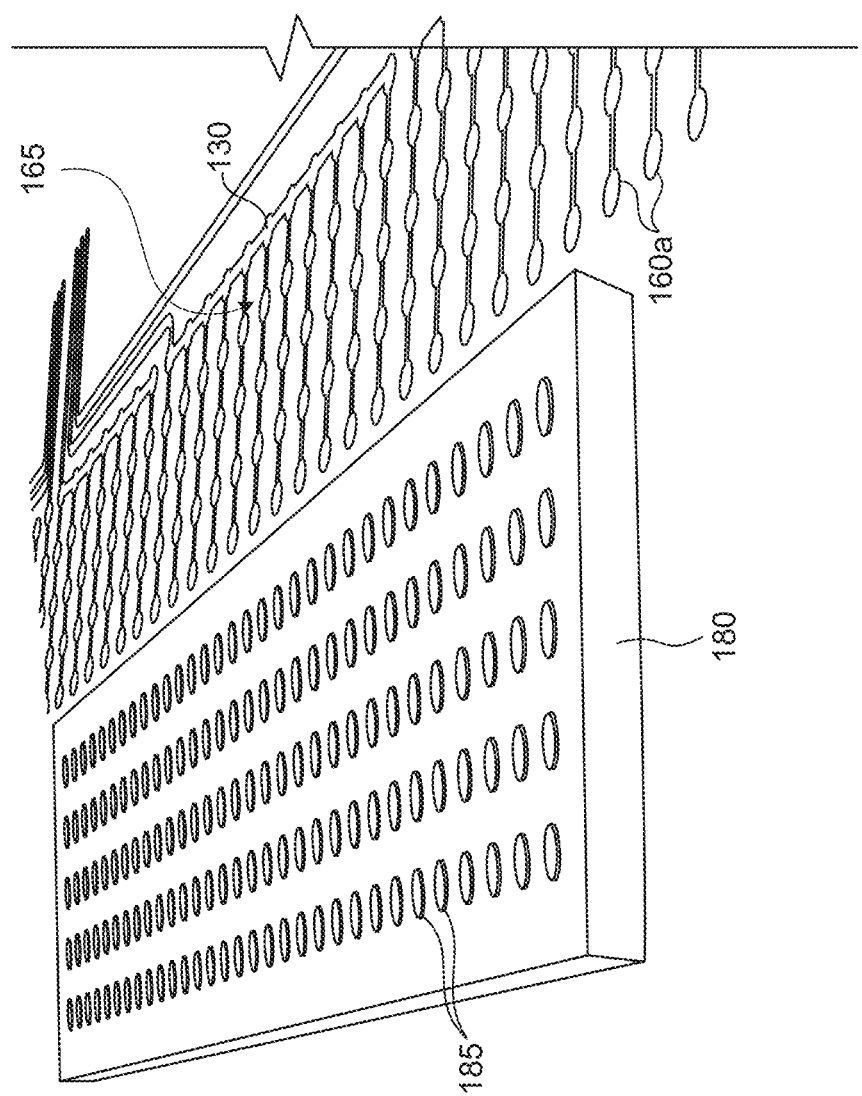
FIG. 7 is a perspective view of an exemplary force transmitting layer of a bumper assembly.
Figure 8A:
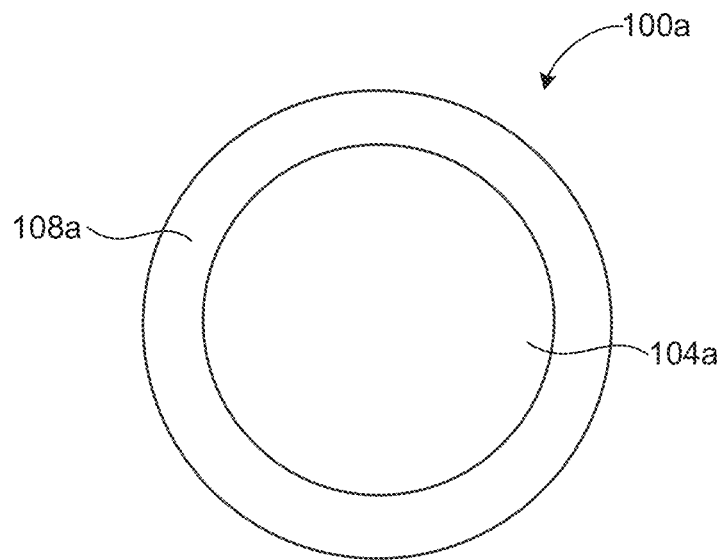
FIGS. 8A-8D are schematic top views of exemplary robot chasses having a bumper.
Figure 8B:
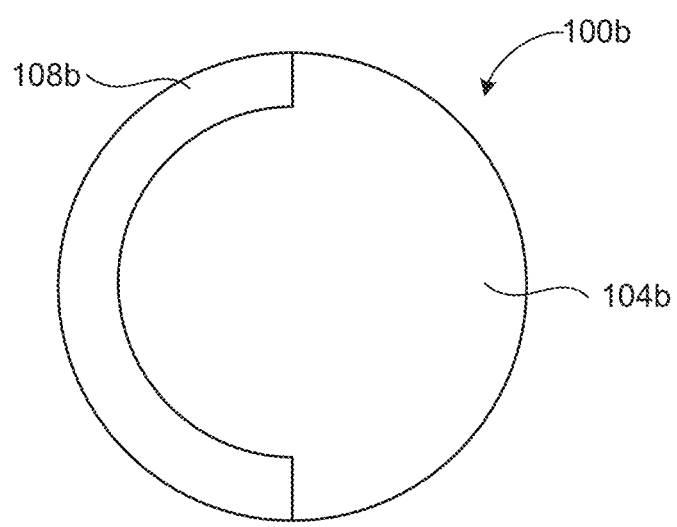
Figure 8C:
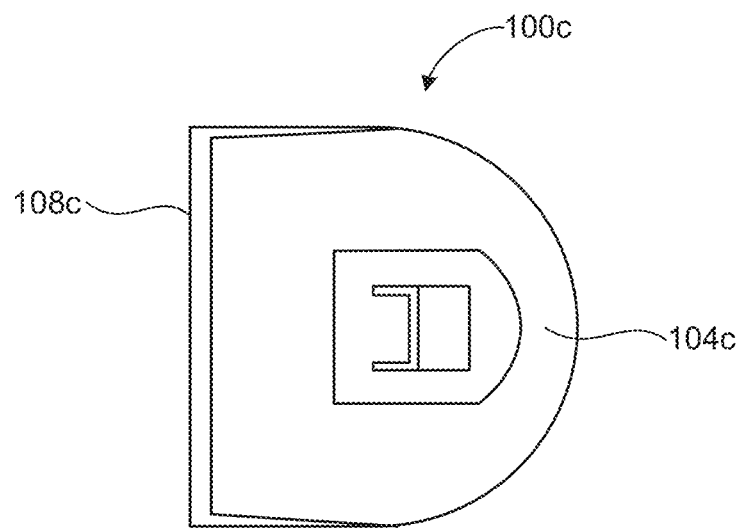
Figure 8D:
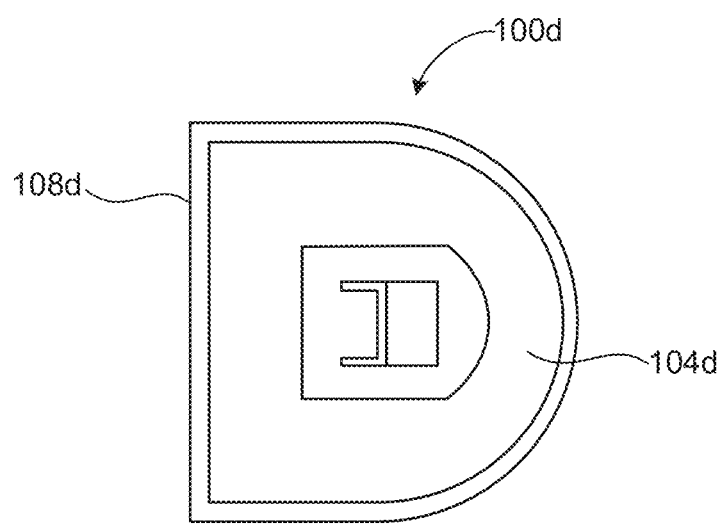

Referring to FIGS. 2A and 6B, in some implementations, the first conductive layer 130 of the sensing layer 120 includes rows of contacts 160 that sit on a smooth surface 110 (i.e., the forward facing portion of the robot body 107). The first conductive layer 130 lies on a separation layer 150. The separation layer 150 includes openings 170. As previously discussed, the openings 170 may be adjusted in diameter to adjust the sensitivity of the membrane switch assembly layer 120 and therefore adjusting the sensitivity of the bumper assembly 108. The second conductive layer 140 may include a switch matrix that closes the switch if in contact with the first conductive layer 130. Adjacent to the second conductive layer 140 is a force transmitting or activation layer 180. The force transmitting or activation layer 180 may include two layers that are attached to the first conductive layer 130 by kiss cutting and dies. The first layer includes force transmitting elements 185. The second layer includes a surface 182. In some examples, the height of the transmitting elements 185 is manipulated to adjust the sensitivity of the bumper assembly 108. The transmitting elements 185 may be kiss cut. Kiss cutting is a process where the element backing is not cut and the only cut is around the element, creating a protrusion (e.g., the transmitting elements 185). The surface 182 may be die cut. Die cutting cuts the shape of the element. Both die cutting and kiss cutting use a die to cut the shape of the elements. The die is usually customized to the specific requirements of the element. The surface 182 is boned to the second conductive layer 140 and around the transmitting elements 185. The surface 182 provides a spacer between the transmitting elements 185 and the electrical contacts 160. The surface 182 and the transmitting elements 185 may be made of a stiffer material than the foam used in the shock absorbing layer 188 that deforms when the bumper assembly 108 is impacted. The shock absorbing layer 188 provides the shape of the bumper 108 and compresses when the bumper is impacted. The compression is transmitted through the foam of the shock absorbing layer 188, and moves the transmitting elements 185, which then closes the switch in the first conductive layer 130. In some examples, an external layer 190 is used as an outer protective layer and provides a skin that may be adjusted in feel without consideration of the feel of the foam used in the shock absorbing layer 188. The external layer 190 increases the life of the bumper assembly 190 due to the protection it provides to the member switch assembly 120.

As shown in FIGS. 3 and 8A-8D, the bumper assembly 108 may be used to form a bumper 108b, 108c that covers only a portion of the robot chassis 104b, 104c or a bumper 108a, 108d that surrounds the robot chassis 104a, 104d. The bumper assembly 108 is sufficiently flexible to conform to a round contour (FIGS. 8A, 8B) of the robot chassis 104a, 104b or may take on a square form (FIGS. 8C, 8D) to conform to a robot chassis 104c, 104d. Similarly, the flexibility of the bumper assembly 108 permits the membrane switch assembly 120 to extend beyond a side of the chassis 104 and onto a top edge 109 (FIG. 1A) of the robot chassis 104. Providing a membrane switch assembly layer 120 along a top edge of the robot chassis 104, permits detection of forces pushing down onto, or wedging, the chassis of the robot. This is particularly useful when the robot 100 is in an environment in which it may travel under low-hanging objects. It may be desirable for a membrane switch assembly layer 120 positioned on a top of a robot chassis 104 to be less sensitive than a membrane switch assembly layer 120 positioned on an edge of the robot chassis 104. As discussed above, the sensitivity of portions of the membrane switch assembly layer 120 may be varied by adjusting the size, spacing, and position of the electrical contacts 160a, 160b, the size, shape, and spacing of the openings 170 in the separator layer 150, and the stiffness of the foam of force transmitting layer 180 as well as the size and shape of the force transmitting elements 185.

The bumper assembly 108 may use approximately one third of the physical volume required by previous bumpers. It has no moving parts, thus eliminating mechanical mounting complexity, visual seams, and pinch points. The bumper assembly 108, as described, offers a virtually unlimited number of detection zones for vastly superior localization of impact points, and will allow an approximation of the force of an impact by counting the number of contact points detected. Finally, the bumper assembly 108 is useful as a full-surround bumper that can detect impacts from the front, sides, and rear, and also can detect wedging forces from above.

Figure 9B:
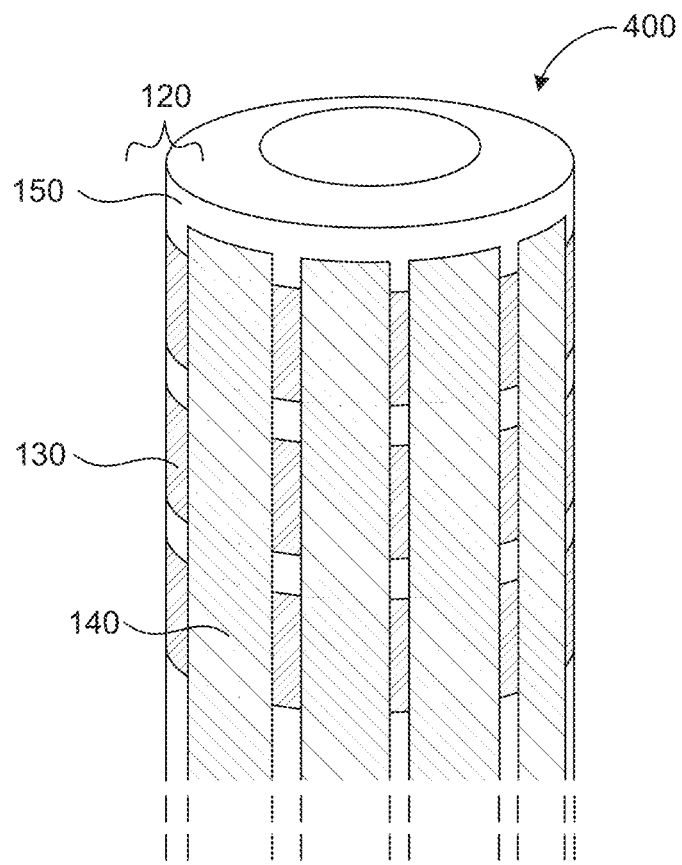
FIG. 9B is a perspective view of an exemplary membrane switch assembly layer applied to a cylinder.
Figure 9C:
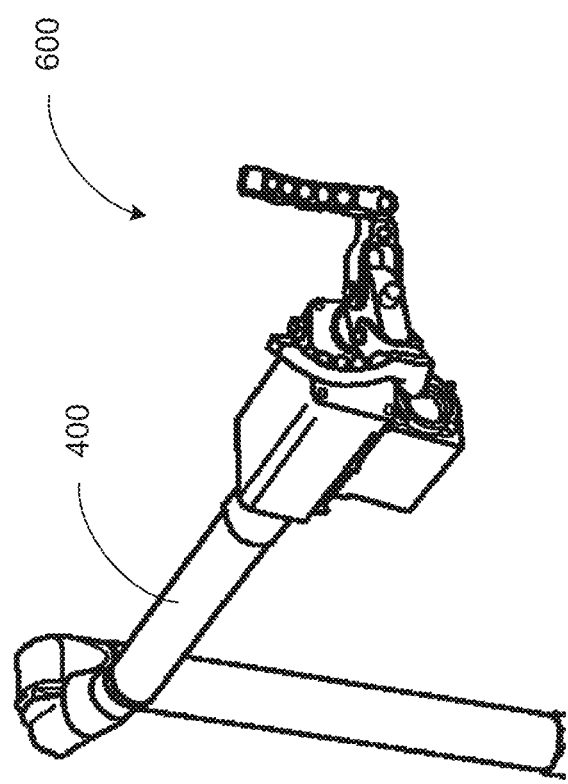
FIG. 9C is a perspective view of an exemplary manipulator having a membrane switch assembly layer applied to a cylindrical arm portion of the manipulator.

Referring to FIGS. 9A-9C, in some implementations the sensing or membrane switch assembly layer 120 may be applied to a cylinder 400. The cylinder 400 may be implemented in a robot for detecting any bump or pressure applied to the portion of the robot having the membrane switch assembly layer 120. In some examples, a robot 100 may include a robot arm 600 for manipulating and moving objects. The robot arm 600 may include the cylinder 400 surrounded by the membrane switch assembly layer 120. As described earlier, the sensing or membrane switch assembly layer 120 may include a first conductive layer 130, a second conductive layer 140, and an intervening separation layer 150. The first conductive layer 130 extends horizontally and includes a conductive zone 132a-f (e.g., strip of conductive tape) the second conductive layer 140 extends vertically forming a grid pattern with the first conductive layer 130. In some examples, the first and second layers 130, 140 are perpendicular to one another. Additionally, a separation layer 150 extends the length of the horizontal first conductive layer 130. The separation layer 150 may be a single sheet positioned between the first and second conductive layers 130, 140.

In some implementations, the first conductive layer 130 is in communication with the robot controller 200, which may include an analog-to-digital converter (ADC) 210. An ADC 210 is a device for converting a continuous physical quantity to a digital number. The continuous physical quantity may be an electrical voltage and the digital number represents the physical quantity's amplitude. The robot controller 200 may activate a single zone 132a-f of the first conductive layer 130 (e.g., allow/accept signals generated in that zone 132a-f) without activating the other zones 132a-f of that layer 130. Additionally, the vertical second conductive layer 140 may also be connected to the robot controller 200. When the robot controller 200 activates a horizontal zone 132a-f of the first conductive layer 130, the ADC 210 reads data for each of the vertical zones 142a-f intersecting the activated horizontal zone 132a-f. The collected ADC data is indicative of the pressure being applied at a specific point on the zone matrix formed by the first and second conductive layers 130, 140.

Referring to FIG. 9D, in some implementations, the sensing or membrane switch assembly layer 120 may have several applications such as robotic forearms 600 or as a skin 620 for a surrogate hand or finger. In some examples, the sensing or membrane switch assembly layer 120 may be dispose on a base 602 for sensing a load distribution about the base 602.

Figure 10:
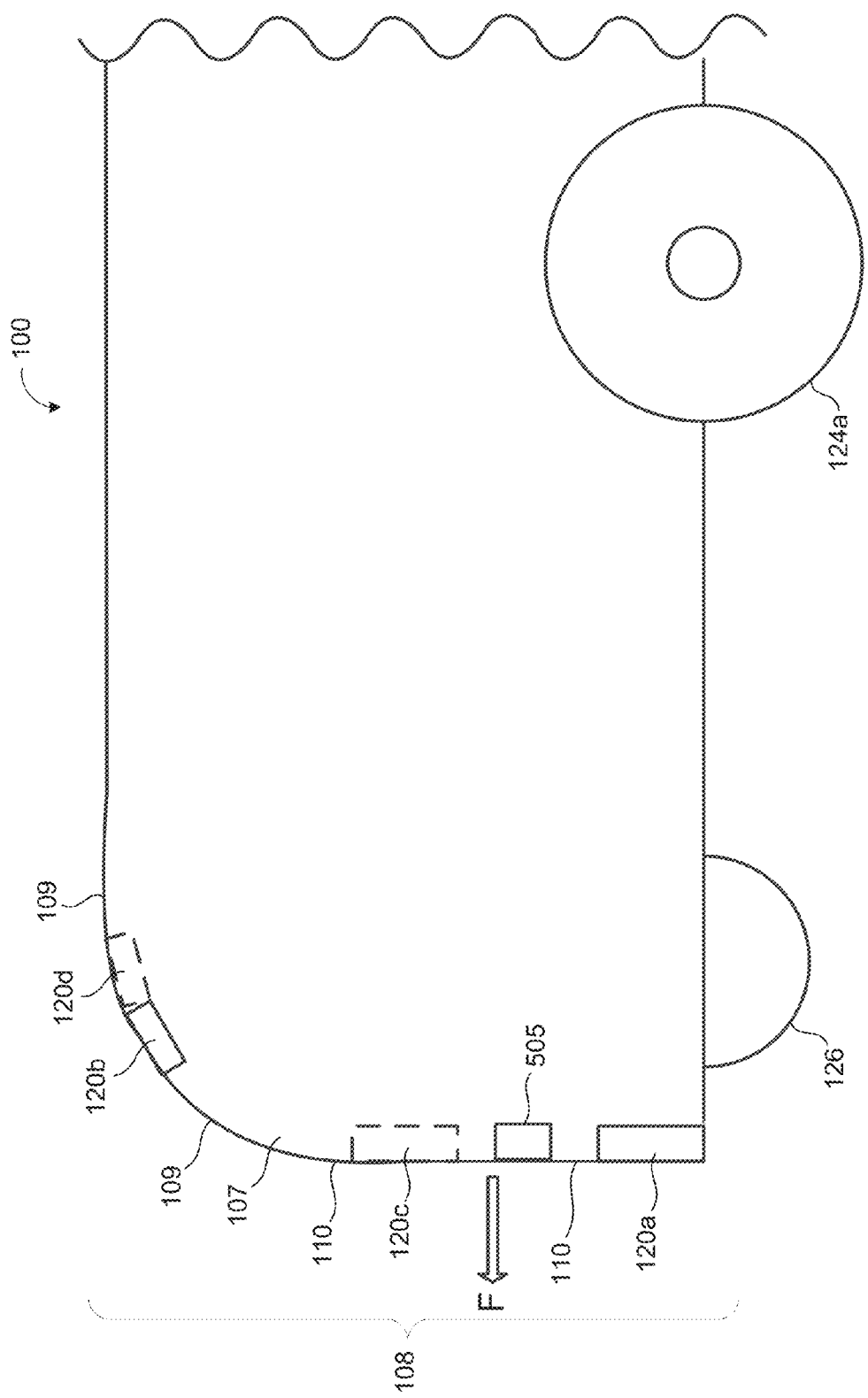
FIG. 10 is a schematic side view of an exemplary portion of a robot and sensor arrays thereon.

Referring to FIG. 10, in some implementations, the robot 100 includes a bumper assembly 108 having a bumper body 107 carrying one or more discretely placed obstacle sensors 120a, 120c and one or more discretely placed wedge sensors 120b, 120d. The sensors 120a-d can be any switch for indicating contact, such as, but not limited to, any of the implementations of the membrane switch assembly layer 120 described above, a capacitor/dielectric switch having a compressible dielectric layer positioned between two capacitor layers, or any binary switch. In the example shown in FIG. 10, the sensors 120a, 102b are arrays of the same type in the bump and wedge positions, the bump position being located on a wall portion 110 of the bumper assembly 108 positioned in the forward direction of travel F and the wedge position being located on a top surface 109, or "top ramp portion 109", of the bumper body 107, which may be angled as indicated. Here, the descriptor "angled" includes curved surface contours. In some examples, the obstacle sensor arrays 120a, 120b and optional wedge sensor arrays 120c, 120d may be pre-formed to match the contours of the wall portion 110 and top ramp portion 109 of the bumper body 107. Moreover, the pre-formed sensor arrays 120a-d may be of the piezoresistive membrane switch assembly type described herein.

A first array of sensors 120a may be disposed along the contour of the wall portion 110 of the bumper body 107 or the bumper assembly 108 facing forward in the direction of travel F. The term "array" initially means different sensing positions along the contour. Optionally, the array 120a also extends vertically for different sensing positions along the height of the wall portion 110 of the bumper body 107. This may be achieved by providing a continuous sensor array 120a or two or more discrete sensor arrays 120a, 120b positioned at discrete heights along the contour of the bumper 108 (i.e. along the peripheral bumper profile). In this later implementation, the two discrete sensor arrays 120a, 120c are separated by a non-contact ODOA sensor array 505. Separating the discrete bump sensor arrays 120a, 120c leaves an unoccupied portion of the wall portion 110 of the bumper body 107 for positioning one or more additional sensors thereon and/or therein without obstructing the field of view therefrom. In implementations having two or more bump sensor arrays 120a, 120c discretely positioned along the height of the wall portion 110, the placement of these sensors 120a, 120c at discrete positions along the height of the wall portion 110 enables the robot 100 to sense contact in a range of locations along the robot 100 that bump into typically encountered objects (e.g. walls, chair legs, toe kicks, etc.).

In some implementations, a second array of sensors 120b is disposed along the top ramp portion 109 of the forward contour of the bumper body 107, the portion of the bumper body 107 that angles back in a direction away from the forward direction of travel F. The term "array" initially means different sensing positions along the contour (i.e. along the peripheral bumper profile). Optionally, the array 120b also extends vertically for different sensing positions along the height of the ramp portion 109 the bumper body 107. This may be achieved by providing a continuous sensor array 120b or two or more discrete sensor arrays 120b, 120d positioned at discrete heights along the contour of the bumper body 107 (i.e. along the periphery of the bumper assembly 108).

The two or more discrete bump sensor arrays 120a, 120c and two or more discrete wedge sensor arrays 120b, 120d enable the robot 100 to discern height of impact. The robot 100 may use the bump and wedge sensor arrays 120a, 120b and optional bump and wedge sensor arrays 120c, 120d to compare timing of signals output from different array positions along the wall portion 110 and top ramp portion 109 to determine whether obstacle contacted by the robot 100 is moving (e.g. bumping a moving shoe vs. a stationary chair leg).

As described above, the obstacle sensor arrays 120a, 120c and optional wedge sensor arrays 120b, 120d may be adjusted to a sensing threshold for detecting a range of obstacles such as, but not limited to, soft obstacles, moving obstacles, walls, and furniture vs. walls. The robot 100 may use the obstacle sensor arrays 120a, 120c and optional wedge sensor arrays 120b, 120d to compare continuously or discretely variable pressure to determine the character of impacted material (e.g., curtains).

In some examples, the robot 100 uses the wedge sensor arrays 120b, 120d along the top ramp portion 109 of the forward contour of the bumper body 107 to compare continuously or discretely variable pressure to determine character of overhanging surface. For example, the robot 100 can detect an increasing wedge risk because the vertical position of the sensor arrays 120b, 120d detecting contact is extending down the top 109 of the robot, or a decreasing wedge risk because the vertical position of the sensor arrays 120b, 120d detecting contact is extending up. Additionally or alternatively, the robot 100 may detect a high wedge risk because the surface area of wedging overhang contacting the wedge sensor arrays 120b, 120d is wide and/or soft or the robot 100 may detect a low wedge risk because surface area of wedging overhang contacting the wedge sensor arrays 120b, 120d is narrow and/or hard.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A robot bumper comprising:
   a bumper body having a forward surface and a top surface angling away from the forward surface, the bumper body conforming to a shape of a received robot chassis;
   a force absorbing layer disposed on the bumper body;
   a membrane switch layer comprising a plurality of electrical contacts arranged along the top surface of the bumper body; and
   a force transmission layer disposed between the force absorbing layer and the membrane switch layer, the force transmission layer comprising a plurality of force transmitting elements configured to transmit force to the membrane switch layer.

2. The robot bumper of claim 1, wherein the membrane switch layer comprises a first sheet having a plurality of electrical contact points and a second sheet having a plurality of electrical contact points.

3. The robot bumper of claim 2, wherein the membrane switch layer further comprises a separator layer positioned between the first and second sheets and configured to prevent accidental or incidental contact between the plurality of electrical contact points on the first and second sheets.

4. The robot bumper of claim 3, wherein the separation layer comprises a piezoresistive material.

5. The robot bumper of claim 2, wherein the electrical contact points on the first sheet form a first pattern and the electrical contact points on the second sheet form a second pattern.

6. The robot bumper of claim 5, wherein the first pattern and the second pattern are identical.

7. The robot bumper of claim 2, wherein the plurality of electrical contact points on each sheet form a plurality of zones, each zone corresponding to an impact point on an external surface of the bumper.

8. The robot bumper of claim 7, wherein each electrical contact point forms an individual zone.

9. The robot bumper of claim 1, wherein the layers conform to a shape of a robot chassis.

* * * * *